(12) United States Patent
Taguchi et al.

(10) Patent No.: US 8,718,828 B2
(45) Date of Patent: May 6, 2014

(54) INFORMATION PROCESSING APPARATUS AND COMPUTER READABLE MEDIUM

(75) Inventors: Masahiro Taguchi, Tokyo (JP); Takayuki Kishimoto, Tokyo (JP); Shinji Kawamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 552 days.

(21) Appl. No.: 13/018,056

(22) Filed: Jan. 31, 2011

(65) Prior Publication Data
US 2012/0041601 A1    Feb. 16, 2012

(30) Foreign Application Priority Data

Aug. 12, 2010    (JP) ................................. 2010-181082

(51) Int. Cl.
*G06F 19/00*    (2011.01)
(52) U.S. Cl.
USPC .......................... 700/284; 713/321; 340/567
(58) Field of Classification Search
USPC ............. 700/83, 79, 297, 284, 278; 713/321; 600/509; 604/151; 340/567; 307/116
See application file for complete search history.

(56) References Cited

U.S. PATENT DOCUMENTS

| | | | | |
|---|---|---|---|---|
| 5,221,919 A | * | 6/1993 | Hermans | 340/567 |
| 5,473,202 A | * | 12/1995 | Mudge et al. | 307/116 |
| 5,986,351 A | * | 11/1999 | Sauerbrey et al. | 307/10.1 |
| 6,415,984 B1 | * | 7/2002 | Parker et al. | 236/49.3 |
| 7,924,155 B2 | * | 4/2011 | Soccoli et al. | 340/567 |
| 7,925,383 B2 | * | 4/2011 | Kwon et al. | 700/276 |
| 2003/0016129 A1 | * | 1/2003 | Menard et al. | 340/531 |
| 2009/0299504 A1 | | 12/2009 | Kumazawa | |
| 2011/0160881 A1 | * | 6/2011 | Grey | 700/90 |
| 2012/0095601 A1 | * | 4/2012 | Abraham et al. | 700/278 |
| 2012/0303554 A1 | * | 11/2012 | Osann, Jr. | 705/412 |

FOREIGN PATENT DOCUMENTS

| | | |
|---|---|---|
| JP | 2001-251790 A | 9/2001 |
| JP | 2002-222010 A | 8/2002 |
| JP | 2004-220445 A | 8/2004 |
| JP | 2006-087158 A | 3/2006 |
| JP | 3953479 B2 | 5/2007 |
| JP | 2009-290967 A | 12/2009 |

\* cited by examiner

*Primary Examiner* — Kidest Bahta
(74) *Attorney, Agent, or Firm* — Sughrue Mion, PLLC

(57) ABSTRACT

An information processing apparatus includes an area environment load calculation module, a user environment load calculation module, a user improvement environment load calculation module, a comparison module and an output module. The area environment load calculation module calculates an environment load in an area in a room. The user environment load calculation module calculates an environment load of each user staying in the area based on the environment load calculated by the area environment load calculation module. The user improvement environment load calculation module calculates, based on a policy set in advance, an environment load of each user when the policy is adopted. The comparison module compares the environment load calculated by the user environment load calculation module with the environment load calculated by the user improvement environment load calculation module. The output module outputs the policy based on the number of users.

8 Claims, 43 Drawing Sheets

FIG. 4

| FLOOR ID | NUMBER OF ROOMS | LIST | REMARKS |
|---|---|---|---|
| 10 | 4 | 1001、1002、1003、10E1 | |
| ... | ... | ... | |
| B1 | 3 | B101、B102、B1E1 | |

| ROOM ID 510 | APPLICATION 520 | CAPACITY 530 | AREA 540 | | LIGHTING DIVISION 550 | | AIR CONDITIONING DIVISION 560 | | DISTRIBUTION BOARD (OUTLET) 570 | |
|---|---|---|---|---|---|---|---|---|---|---|
| | | | NO. 542 | ID LIST 544 | NO. 552 | APPARATUS ID LIST 554 | NO. 562 | APPARATUS ID LIST 564 | NO. 572 | APPARATUS ID LIST 574 |
| 1001 | ROOM | 30 | 3 | 1001-a, 1001-b, 1001-c | 3 | L1001-a, L1001-b, L1001-c | 2 | A1001, A1002 | 2 | E1001, E1002 |
| 1002 | ROOM | 15 | 2 | 1002-a, 1002-b | 1 | L1002-a | 1 | A1003 | 1 | E1003 |
| 1003 | ROOM | 30 | 3 | 1003-a, 1003-b, 1003-c | 3 | L1003-a, L1003-b, L1003-c | 2 | A1004, A1005 | 2 | E1004, E1005 |
| 10E1 | ELEVATOR HALL | – | 1 | 10E1-a | 2 | L10E1-a | 1 | A1006 | 1 | E1006 |

| AREA ID | CAPACITY | LIGHTING | | AIR CONDITIONING | | DISTRIBUTION BOARD (OUTLET) | |
| --- | --- | --- | --- | --- | --- | --- | --- |
| | | APPARATUS ID | POWER CONSUMPTION (Wh) | APPARATUS ID | PROPORTIONAL DIVISION VALUE OF POWER CONSUMPTION | APPARATUS ID | PROPORTIONAL DIVISION METHOD OF POWER CONSUMPTION |
| 1001-a | 10 | L1001-a | 300 | A1001 | 2/3 | E1001 | 1001-a NUMBER OF PERSONS/ (1001-a NUMBER OF PERSONS + 1001-b NUMBER OF PERSONS/2) |
| 1001-b | 10 | L1001-b | 300 | A1001 | 1/3 | E1001 | (1001-b NUMBER OF PERSONS/2)/ (1001-a NUMBER OF PERSONS + 1001-b NUMBER OF PERSONS/2) |
| | | | | A1002 | 1/3 | E1002 | (1001-b NUMBER OF PERSONS/2)/ (1001-c NUMBER OF PERSONS + 1001-b NUMBER OF PERSONS/2) |
| 1001-c | 10 | L1001-c | 300 | A1002 | 2/3 | E1002 | 1001-c NUMBER OF PERSONS/ (1001-c NUMBER OF PERSONS + 1001-b NUMBER OF PERSONS/2) |
| 1002-a | 10 | L1002-a | 225 | A1003 | 1/2 | E1003 | 1002-a NUMBER OF PERSONS/ (1002-a NUMBER OF PERSONS + 1002-b NUMBER OF PERSONS) |
| 1002-b | 5 | L1002-a | 225 | A1003 | 1/2 | E1003 | 1002-b NUMBER OF PERSONS/ (1002-a NUMBER OF PERSONS + 1002-b NUMBER OF PERSONS) |
| 1003-a | 10 | L1003-a | 300 | A1004 | 2/3 | E1004 | 1003-a NUMBER OF PERSONS/ (1003-a NUMBER OF PERSONS + 1003-b NUMBER OF PERSONS/2) |
| 1003-b | 10 | L1003-b | 300 | A1004 | 1/3 | E1004 | (1003-b NUMBER OF PERSONS/2)/ (1003-a NUMBER OF PERSONS + 1003-b NUMBER OF PERSONS/2) |
| | | | | A1005 | 1/3 | E1005 | (1003-b NUMBER OF PERSONS/2)/ (1003-c NUMBER OF PERSONS + 1003-b NUMBER OF PERSONS/2) |
| 1003-c | 10 | L1003-c | 300 | A1005 | 2/3 | E1005 | 1003-c NUMBER OF PERSONS/ (1003-c NUMBER OF PERSONS + 1003-b NUMBER OF PERSONS/2) |
| 10E1-a | - | L10E1-a | 300 | A1006 | 1 | E1006 | 1 |

| AREA ID | USER ID LIST | NUMBER OF USERS | UPDATE TIME |
|---|---|---|---|
| 1001-a | ID0021<br>ID0042<br>ID0013 | 3<br>(THREE PERSONS) | 20090908090000<br>(09:00, SEP. 8, 2009) |
| 1001-b | ID0022<br>ID0023 | 2 | 20090908090000 |
| 1001-c | ID0025 | 1 | 20090908090000 |

910 — AREA ID
920 — USER ID LIST
930 — NUMBER OF USERS
940 — UPDATE TIME
900

FIG. 10

| APPARATUS ID | TYPE | STATE | POWER CONSUMPTION (Wh) | UPDATE TIME |
|---|---|---|---|---|
| L1001-a | LIGHTING | ON | 300 | 20090908090000 |
| L1001-b | LIGHTING | ON | 300 | 20090908090000 |
| L1001-c | LIGHTING | ON | 300 | 20090908090000 |
| L1002-a | LIGHTING | ON | 450 | 20090908090000 |
| A1001 | AIR CONDITIONING | ON | 1800 | 20090908090000 |
| A1002 | AIR CONDITIONING | ON | 1800 | 20090908090000 |
| A1003 | AIR CONDITIONING | ON | 1800 | 20090908090000 |
| E1001 | OUTLET | – | 80 | 20090908090000 |
| E1002 | OUTLET | – | 40 | 20090908090000 |
| E1003 | OUTLET | – | 100 | 20090908090000 |

FIG. 11

| APPARATUS ID | MEASURED POWER CONSUMPTION | AREA ID | POWER CONSUMPTION (Wh) | UPDATE TIME |
|---|---|---|---|---|
| L1001-a | 300 | 1001-a | 300 | 20090908090000 |
| L1001-b | 300 | 1001-b | 300 | 20090908090000 |
| L1001-c | 300 | 1001-c | 300 | 20090908090000 |
| L1002-a | 450 | 1002-a<br>1002-b | 225<br>225 | 20090908090000<br>20090908090000 |
| A1001 | 1800 | 1001-a<br>1001-b | 1200<br>600 | 20090908090000<br>20090908090000 |
| A1002 | 1800 | 1001-b<br>1001-c | 600<br>1200 | 20090908090000<br>20090908090000 |
| A1003 | 1800 | 1002-a<br>1002-b | 900<br>900 | 20090908090000<br>20090908090000 |
| E1001 | 80 | 1001-a<br>1001-b | 60<br>20 | 20090908090000<br>20090908090000 |
| E1002 | 40 | 1001-b<br>1001-c | 20<br>20 | 20090908090000<br>20090908090000 |
| E1003 | 100 | 1002-a<br>1002-b | 100<br>0 | 20090908090000<br>20090908090000 |

Columns: 1110, 1120, 1130, 1140, 1150; Table 1100

FIG. 12

| AREA ID | POWER CONSUMPTION(Wh) | | | AMOUNT OF ENVIRONMENT LOAD (CO2-g/h) | UPDATE TIME |
|---|---|---|---|---|---|
| | APPARATUS ID | PROPORTIONAL DIVISION | TOTAL | | |
| 1001-a | L1001-a<br>A1001<br>E1001 | 300<br>1200<br>60 | 1560 | 865.8 | 200909080900000 |
| 1001-b | L1001-b<br>A1001<br>A1002<br>E1001<br>E1002 | 300<br>600<br>600<br>20<br>20 | 1540 | 854.7 | 200909080900000 |
| 1001-c | L1001-c<br>A1002<br>E1002 | 300<br>1200<br>20 | 1520 | 843.6 | 200909080900000 |
| 1002-a | L1002-a<br>A1003<br>E1003 | 225<br>900<br>100 | 1225 | 679.9 | 200909080900000 |
| 1002-b | L1002-a<br>A1003<br>E1003 | 225<br>900<br>0 | 1125 | 624.4 | 200909080900000 |

FIG. 13

| AREA ID | USER ID LIST | NUMBER OF USERS | UPDATE TIME |
|---|---|---|---|
| 1001-a | ID0021<br>ID0042<br>ID0013 | 3<br>(THREE PERSONS) | 20090908090000<br>(09:00, SEP. 8, 2009) |
| 1001-b | ID0022<br>ID0023 | 2 | 20090908090000 |
| 1001-c | ID0025 | 1 | 20090908090000 |

| AREA ID | USER ID LIST | NUMBER OF USERS | AMOUNT OF ENVIRONMENT LOAD (CO2-g/h) | UPDATE TIME |
|---|---|---|---|---|
| 1001-a | ID0021<br>ID0042<br>ID0013 | 3<br>(THREE PERSONS) | 865.8 | 20090908090000<br>(09:00, SEP. 8, 2009) |
| 1001-b | ID0022<br>ID0023 | 2 | 854.7 | 20090908090000 |
| 1001-c | ID0025 | 1 | 843.6 | 20090908090000 |

| USER ID | AREA ID | AMOUNT OF ENVIRONMENT LOAD OF EACH PERSON ($CO_2$-g/h) | UPDATE TIME |
|---|---|---|---|
| ID0013 | 1001-a | 288.6 | 20090908090000 |
| ID0021 | 1001-a | 288.6 | 20090908090000 |
| ID0022 | 1001-b | 427.4 | 20090908090000 |
| ID0023 | 1001-b | 427.4 | 20090908090000 |
| ID0025 | 1001-c | 843.6 | 20090908090000 |
| ID0042 | 1001-a | 288.6 | 20090908090000 |

FIG. 19

| ROOM ID 1910 | CAPACITY 1920 | NUMBER OF USERS 1930 | AREA 1940 | | | | | UPDATE TIME 1960 |
|---|---|---|---|---|---|---|---|---|
| | | | ID LIST 1942 | CAPACITY 1944 | NUMBER OF USERS - CAPACITY 1946 | PACKING POSSIBILITY 1948 | AREA USED AFTER IMPROVEMENTS 1950 | |
| 1001 | 30 | 5 | 1001-a<br>1001-b<br>1001-c | 10<br>10<br>10 | −5<br>−<br>− | Yes | Yes<br>No<br>No | 20090908090000 |
| 1002 | 15 | 2 | 1002-a<br>1002-b | 10<br>5 | −8<br>− | Yes | Yes<br>No | 20090908090000 |
| 1003 | 30 | 25 | 1003-a<br>1003-b<br>1003-c | 10<br>10<br>10 | 15<br>5<br>−5 | No<br>No<br>Yes | Yes<br>Yes<br>Yes | 20090908090000 |

| AREA ID | CURRENT STATE | | | IMPROVEMENT ESTIMATION | | | AMOUNT OF ENVIRONMENT LOAD (CO$_2$-g/h) |
|---|---|---|---|---|---|---|---|
| | POWER CONSUMPTION (Wh) | | | POWER CONSUMPTION (Wh) | | | |
| | APPARATUS ID | PROPORTIONAL DIVISION | ELECTRIC POWER | APPARATUS ID | PROPORTIONAL DIVISION | ELECTRIC POWER | |
| 1001-a (USED) | L1001-a<br>A1001<br>E1001 | 300<br>1200<br>60 | 1560 | L1001-a<br>A1001<br>E1001 | 300<br>1200<br>120 | 1620 | 899.1 |
| 1001-b (UNUSED) | L1001-b<br>A1001<br>A1002<br>E1001<br>E1002 | 300<br>600<br>600<br>20<br>20 | 1540 | L1001-b<br>A1001<br>A1002<br>E1001<br>E1002 | 0<br>600<br>0<br>0<br>0 | 600 | 333.0 |
| 1001-c (UNUSED) | L1001-c<br>A1002<br>E1002 | 300<br>1200<br>20 | 1520 | L1001-c<br>A1002<br>E1002 | 0<br>0<br>0 | 0 | 0.0 |
| TOTAL | | | 4620 | | | 2220 | 1232.1 |

FIG. 21

| PERSONAL ID | CURRENT STATE | | IMPROVEMENT ESTIMATION | |
|---|---|---|---|---|
| | AREA ID | AMOUNT OF ENVIRONMENT LOAD (CO2-g/h) | AREA ID | AMOUNT OF ENVIRONMENT LOAD (CO2-g/h) |
| ID0013 | 1001-a | 288.6 | 1001-a | 149.9 (205.4) |
| ID0021 | 1001-a | 288.6 | 1001-a | 149.9 (205.4) |
| ID0022 | 1001-b | 427.4 | 1001-a | 149.9 (205.4) |
| ID0023 | 1001-b | 427.4 | 1001-a | 149.9 (205.4) |
| ID0025 | 1001-c | 843.6 | 1001-a | 149.9 (205.4) |
| ID0042 | 1001-a | 288.6 | 1001-a | 149.9 (205.4) |

FIG. 22

| | | CURRENT STATE | | | IMPROVEMENT ESTIMATION | | | |
|---|---|---|---|---|---|---|---|---|
| | | POWER CONSUMPTION (Wh) | | | POWER CONSUMPTION (Wh) | | | AMOUNT OF ENVIRONMENT LOAD ($CO_2$-g/h) |
| AREA ID | | APPARATUS ID | PROPORTIONAL DIVISION | ELECTRIC POWER | APPARATUS ID | PROPORTIONAL DIVISION | ELECTRIC POWER | |
| 1001-a | | L1001-a<br>A1001<br>E1001 | 300<br>1200<br>60 | 1560 | L1001-a<br>A1001<br>E1001 | 300<br>0<br>1560 | 1860 | 1032.3 |
| 1001-b | | L1001-b<br>A1001<br>A1002<br>E1001<br>E1002 | 300<br>600<br>600<br>20<br>20 | 1540 | L1001-b<br>A1001<br>A1002<br>E1001<br>E1002 | 300<br>0<br>0<br>520<br>520 | 1340 | 743.7 |
| 1001-c | | L1001-c<br>A1002<br>E1002 | 300<br>1200<br>20 | 1520 | L1001-c<br>A1002<br>E1002 | 300<br>0<br>520 | 820 | 455.1 |
| TOTAL | | | | 4620 | | | 3020 | 1676.1 |

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 344.1 |
| ID0021 | 1001-a | 288.6 | 1001-a | 344.1 |
| ID0022 | 1001-b | 427.4 | 1001-b | 371.9 |
| ID0023 | 1001-b | 427.4 | 1001-b | 371.9 |
| ID0025 | 1001-c | 843.6 | 1001-c | 455.1 |
| ID0042 | 1001-a | 288.6 | 1001-a | 344.1 |

FIG. 24

| AREA ID | CURRENT STATE ||| IMPROVEMENT ESTIMATION ||||
| | POWER CONSUMPTION (Wh) ||| POWER CONSUMPTION (Wh) ||| AMOUNT OF ENVIRONMENT LOAD ($CO_2$-g/h) |
| | APPARATUS ID | PROPORTIONAL DIVISION | ELECTRIC POWER | APPARATUS ID | PROPORTIONAL DIVISION | ELECTRIC POWER | |
| 1001-a | L1001-a<br>A1001<br>E1001 | 300<br>1200<br>60 | 1560 | L1001-a<br>A1001<br>E1001 | 30<br>1200<br>150 | 1380 | 765.9 |
| 1001-b | L1001-b<br>A1001<br>A1002<br>E1001<br>E1002 | 300<br>600<br>600<br>20<br>20 | 1540 | L1001-b<br>A1001<br>A1002<br>E1001<br>E1002 | 30<br>600<br>600<br>50<br>50 | 1330 | 738.2 |
| 1001-c | L1001-c<br>A1002<br>E1002 | 300<br>1200<br>20 | 1520 | L1001-c<br>A1002<br>E1002 | 30<br>1200<br>50 | 1280 | 710.4 |
| TOTAL | | | 4620 | | | 3990 | 2214.5 |

FIG. 25

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 255.3 |
| ID0021 | 1001-a | 288.6 | 1001-a | 255.3 |
| ID0022 | 1001-b | 427.4 | 1001-b | 369.1 |
| ID0023 | 1001-b | 427.4 | 1001-b | 369.1 |
| ID0025 | 1001-c | 843.6 | 1001-c | 710.4 |
| ID0042 | 1001-a | 288.6 | 1001-a | 255.3 |

FIG. 26

| AREA ID | CURRENT STATE | | | IMPROVEMENT ESTIMATION | | | |
|---|---|---|---|---|---|---|---|
| | POWER CONSUMPTION (Wh) | | ELECTRIC POWER | POWER CONSUMPTION (Wh) | | ELECTRIC POWER | AMOUNT OF ENVIRONMENT LOAD ($CO_2$-g/h) |
| | APPARATUS ID | PROPORTIONAL DIVISION | | APPARATUS ID | PROPORTIONAL DIVISION | | |
| 1001-a | L1001-a<br>A1001<br>E1001 | 300<br>1200<br>60 | 1560 | L1001-a<br>A1001<br>E1001 | 300<br>0<br>3120 | 3420 | 1891.1 |
| 1001-b | L1001-b<br>A1001<br>A1002<br>E1001<br>E1002 | 300<br>600<br>600<br>20<br>20 | 1540 | L1001-b<br>A1001<br>A1002<br>E1001<br>E1002 | 0<br>0<br>0<br>0<br>0 | 0 | 0.0 |
| 1001-c | L1001-c<br>A1002<br>E1002 | 300<br>1200<br>20 | 1520 | L1001-c<br>A1002<br>E1002 | 0<br>0<br>0 | 0 | 0.0 |
| TOTAL | | | 4620 | | | 3420 | 1891.1 |

FIG. 27

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 361.4 |
| ID0021 | 1001-a | 288.6 | 1001-a | 361.4 |
| ID0022 | 1001-b | 427.4 | 1001-a | 361.4 |
| ID0023 | 1001-b | 427.4 | 1001-a | 361.4 |
| ID0025 | 1001-c | 843.6 | 1001-a | 361.4 |
| ID0042 | 1001-a | 288.6 | 1001-a | 361.4 |

FIG. 28

| AREA ID | CURRENT STATE | | | IMPROVEMENT ESTIMATION | | | |
|---|---|---|---|---|---|---|---|
| | | POWER CONSUMPTION (Wh) | | | POWER CONSUMPTION (Wh) | | |
| | APPARATUS ID | PROPORTIONAL DIVISION | ELECTRIC POWER | APPARATUS ID | PROPORTIONAL DIVISION | ELECTRIC POWER | AMOUNT OF ENVIRONMENT LOAD (CO₂-g/h) |
| 1001-a | L1001-a<br>A1001<br>E1001 | 300<br>1200<br>60 | 1560 | L1001-a<br>A1001<br>E1001 | 30<br>1200<br>300 | 1530 | 849.2 |
| 1001-b | L1001-b<br>A1001<br>A1002<br>E1001<br>E1002 | 300<br>600<br>600<br>20<br>20 | 1540 | L1001-b<br>A1001<br>A1002<br>E1001<br>E1002 | 30<br>600<br>0<br>0<br>0 | 630 | 349.7 |
| 1001-c | L1001-c<br>A1002<br>E1002 | 300<br>1200<br>20 | 1520 | L1001-c<br>A1002<br>E1002 | 30<br>0<br>0 | 30 | 16.7 |
| TOTAL | | 4620 | | | 2190 | | 1215.5 |

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 141.5 (202.6) |
| ID0021 | 1001-a | 288.6 | 1001-a | 141.5 (202.6) |
| ID0022 | 1001-b | 427.4 | 1001-a | 141.5 (202.6) |
| ID0023 | 1001-b | 427.4 | 1001-a | 141.5 (202.6) |
| ID0025 | 1001-c | 843.6 | 1001-a | 141.5 (202.6) |
| ID0042 | 1001-a | 288.6 | 1001-a | 141.5 (202.6) |

FIG. 30

| AREA ID | CURRENT STATE | | | IMPROVEMENT ESTIMATION | | | |
|---|---|---|---|---|---|---|---|
| | POWER CONSUMPTION (Wh) | | | POWER CONSUMPTION (Wh) | | | AMOUNT OF ENVIRONMENT LOAD (CO₂-g/h) |
| | APPARATUS ID | PROPORTIONAL DIVISION | ELECTRIC POWER | APPARATUS ID | PROPORTIONAL DIVISION | ELECTRIC POWER | |
| 1001-a | L1001-a<br>A1001<br>E1001 | 300<br>1200<br>60 | 1560 | L1001-a<br>A1001<br>E1001 | 0<br>0<br>1650 | 1650 | 915.8 |
| 1001-b | L1001-b<br>A1001<br>A1002<br>E1001<br>E1002 | 300<br>600<br>600<br>20<br>20 | 1540 | L1001-b<br>A1001<br>A1002<br>E1001<br>E1002 | 0<br>0<br>550<br>0<br>550 | 1100 | 610.5 |
| 1001-c | L1001-c<br>A1002<br>E1002 | 300<br>1200<br>20 | 1520 | L1001-c<br>A1002<br>E1002 | 0<br>0<br>550 | 550 | 305.3 |
| TOTAL | | | 4620 | | | 3300 | 1831.5 |

FIG. 31

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 305.3 |
| ID0021 | 1001-a | 288.6 | 1001-a | 305.3 |
| ID0022 | 1001-b | 427.4 | 1001-b | 305.3 |
| ID0023 | 1001-b | 427.4 | 1001-b | 305.3 |
| ID0025 | 1001-c | 843.6 | 1001-c | 305.3 |
| ID0042 | 1001-a | 288.6 | 1001-a | 305.3 |

FIG. 33

| PERSONAL ID | CURRENT STATE | | IMPROVEMENT ESTIMATION | |
|---|---|---|---|---|
| | AREA ID | AMOUNT OF ENVIRONMENT LOAD ($CO_2$-g/h) | AREA ID | AMOUNT OF ENVIRONMENT LOAD ($CO_2$-g/h) |
| ID0013 | 1001-a | 288.6 | 1001-a | 305.3 |
| ID0021 | 1001-a | 288.6 | 1001-a | 305.3 |
| ID0022 | 1001-b | 427.4 | 1001-a | 305.3 |
| ID0023 | 1001-b | 427.4 | 1001-a | 305.3 |
| ID0025 | 1001-c | 843.6 | 1001-a | 305.3 |
| ID0042 | 1001-a | 288.6 | 1001-a | 305.3 |

FIG. 34

| MODEL | TOTAL | | EFFECT OF INDIVIDUAL LEVEL | PROPOSAL CANDIDATE |
|---|---|---|---|---|
| | IMPROVEMENT EFFECT (CO2-g/h) | RANK | | |
| P1 MOVEMENT OF SEAT | 1332.0 (2564.1 − 1232.1) | 2 | ○ | |
| P2 AIR CONDITIONING | 888.0 (2564.1 − 1676.1) | 3 | × | |
| P3 LIGHTING | 349.6 (2564.1 − 2214.5) | 7 | ○ | |
| P4 (MOVEMENT OF SEAT) + (AIR CONDITIONING) | 673.0 (2564.1 − 1891.1) | 6 | × | |
| P5 (MOVEMENT OF SEAT) + LIGHTING | 1348.6 (2564.1 − 1215.5) | 1 | ○ | ○ |
| P6 (AIR CONDITIONING) + LIGHTING | 732.6 (2564.1 − 1831.5) | 4 | × | |
| P7 (MOVEMENT OF SEAT) + (AIR CONDITIONING) + LIGHTING | 732.6 (2564.1 − 1831.5) | 4 | × | |

FIG. 35

| MODEL | TOTAL | | EFFECT OF INDIVIDUAL LEVEL | PROPOSAL CANDIDATE |
|---|---|---|---|---|
| | IMPROVEMENT EFFECT ($CO_2$-g/h) | RANK | | |
| P1 MOVEMENT OF SEAT | 15.7 (1271.0 − 1254.3) | 1 | ○ | ○ |
| P3 LIGHTING | 0.0 | | × | |
| P5 (MOVEMENT OF SEAT) + LIGHTING | 0.0 | | × | |

FIG. 40
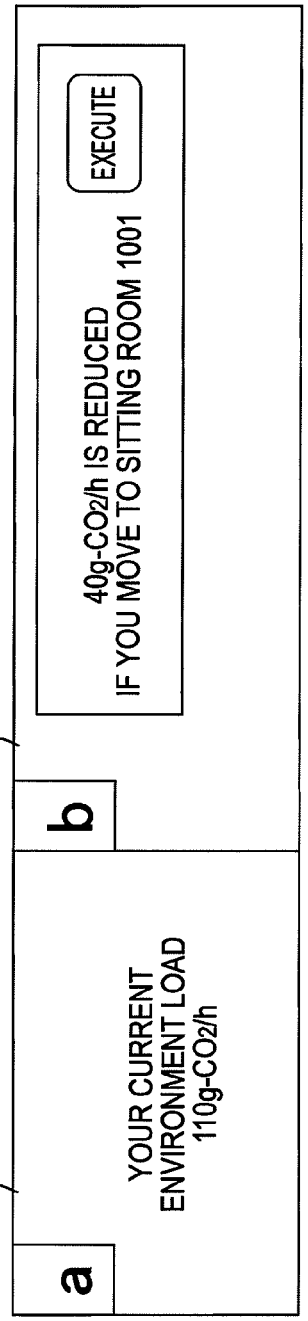
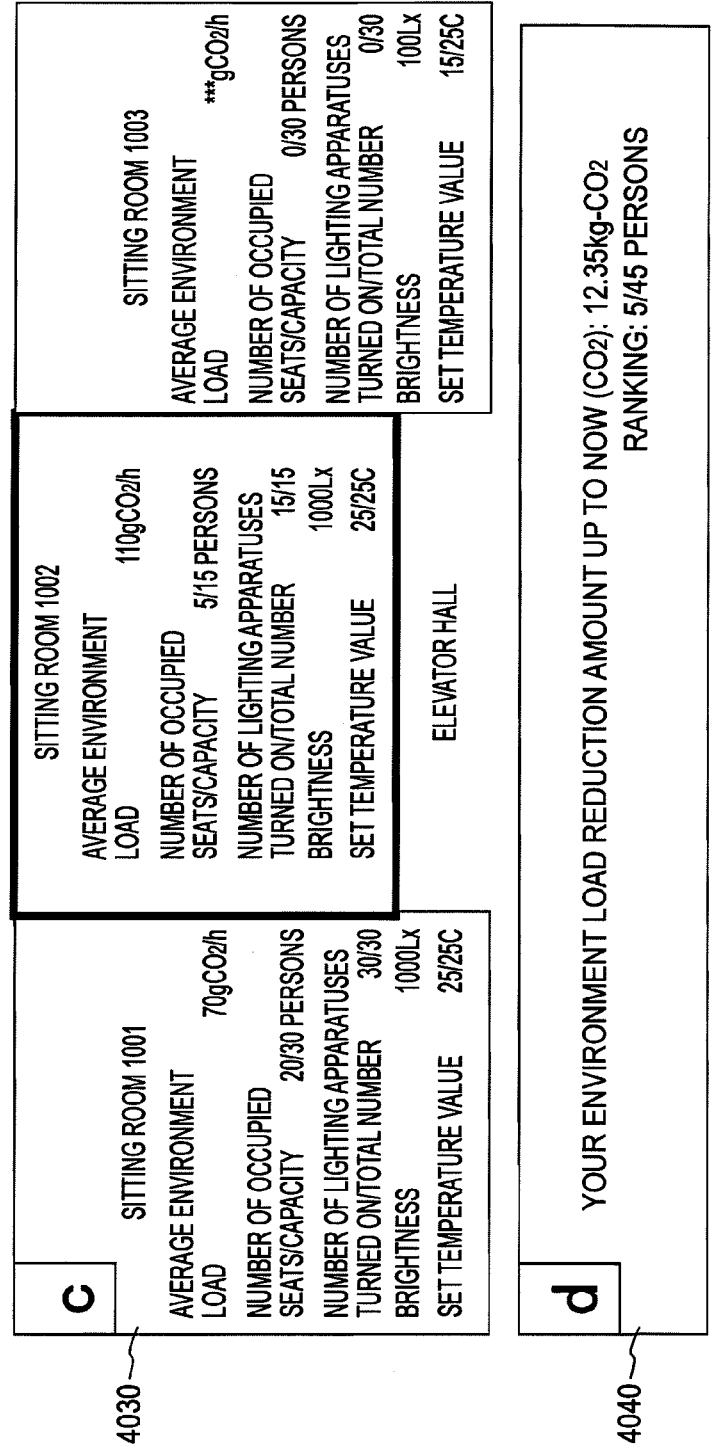

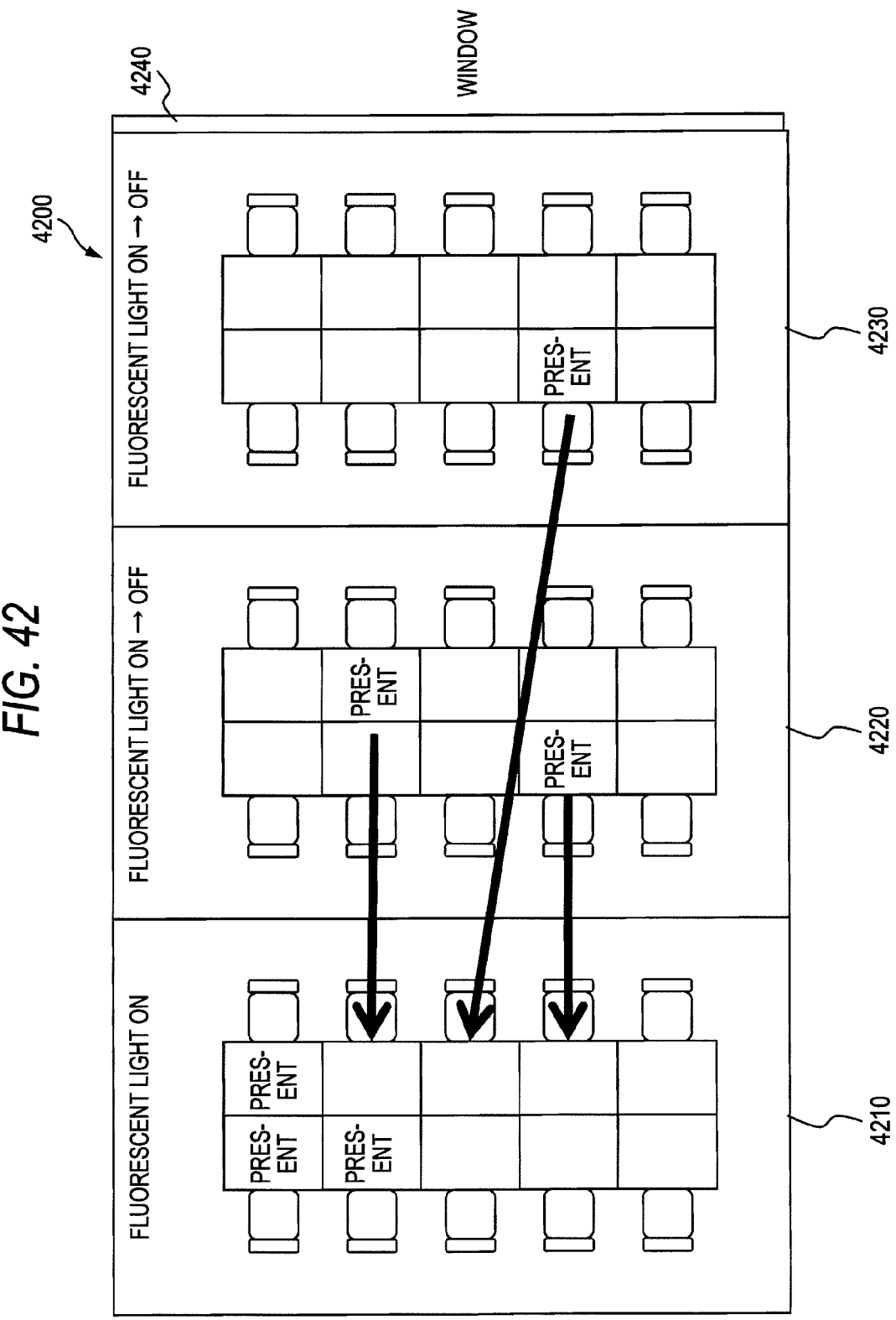

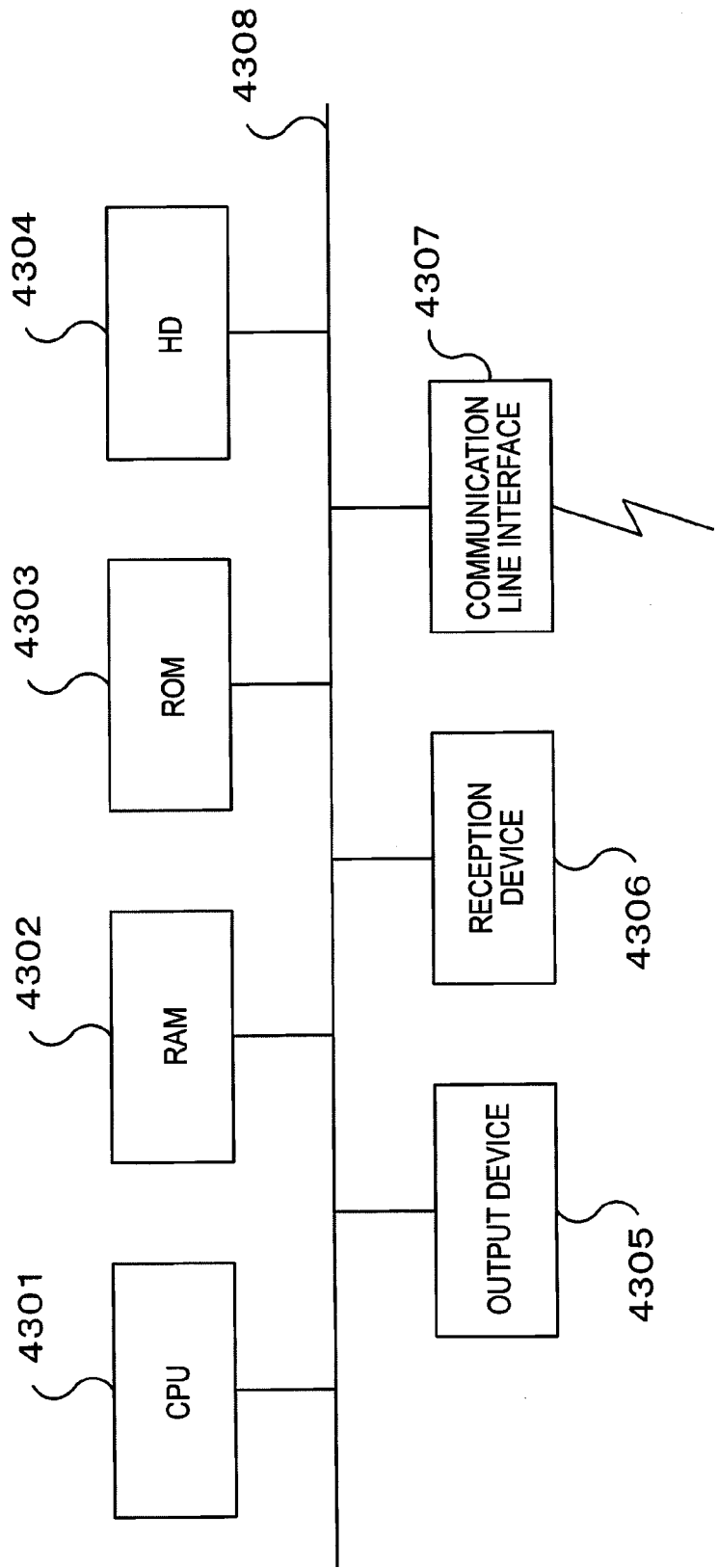

INFORMATION PROCESSING APPARATUS AND COMPUTER READABLE MEDIUM

CROSS-REFERENCE TO RELATED APPLICATIONS

This application is based upon and claims priority under 35 USC 119 from Japanese Patent Application No. 2010-181082, filed Aug. 12, 2010.

BACKGROUND

1. Technical Field

The present invention relates to an information processing apparatus and a computer readable medium.

2. Summary of the Invention

According to an aspect of the invention, an information processing apparatus includes an area environment load calculation module, a user environment load calculation module, a user improvement environment load calculation module, a comparison module and an output module. The area environment load calculation module calculates an environment load in an area in a room. The user environment load calculation module calculates an environment load of each user staying in the area based on the environment load calculated by the area environment load calculation module. The user improvement environment load calculation module calculates, based on a policy set in advance in order to reduce an environment load, an environment load of each user when the policy is adopted. The comparison module compares the environment load calculated by the user environment load calculation module with the environment load calculated by the user improvement environment load calculation module. The output module outputs the policy as a proposal based on the number of users whose environment loads are reduced among the users. The number of users is obtained by the comparison of the comparison module.

BRIEF DESCRIPTION OF THE DRAWINGS

Exemplary embodiments of the invention will be described in detail based on the following figures, wherein:

FIG. 4 is an explanatory view showing an example of the data structure of a floor information table;

FIG. 5 is an explanatory view showing an example of the data structure of a room information table;

FIG. 6 is an explanatory view showing an example of the data structure of an area information table;

FIG. 9 is an explanatory view showing an example of the data structure of an area stay user table;

FIG. 10 is an explanatory view showing an example of the data structure of an apparatus environment load table;

FIG. 11 is an explanatory view showing an example of the data structure of an area proportional division result table;

FIG. 12 is an explanatory view showing an example of the data structure of an area environment load calculation result table;

FIG. 13 is an explanatory view showing an example of the data structure of an area stay user table;

FIG. 15 is an explanatory view showing an example of the data structure of an area stay user environment load table;

FIG. 16 is an explanatory view showing an example of the data structure of an environment load table for every user;

FIG. 19 is an explanatory view showing an example of the data structure of an improvement proposal information table;

FIG. 20 is an explanatory view showing an example of the data structure of an effect check (room) table;

FIG. 21 is an explanatory view showing an example of the data structure of an effect check (individual) table;

FIG. 22 is an explanatory view showing an example of the data structure of an effect check (room) table;

FIG. 24 is an explanatory view showing an example of the data structure of an effect check (room) table;

FIG. 25 is an explanatory view showing an example of the data structure of an effect check (individual) table;

FIG. 26 is an explanatory view showing an example of the data structure of an effect check (room) table;

FIG. 27 is an explanatory view showing an example of the data structure of an effect check (individual) table;

FIG. 28 is an explanatory view showing an example of the data structure of an effect check (room) table;

FIG. 29 is an explanatory view showing an example of the data structure of an effect check (individual) table;

FIG. 30 is an explanatory view showing an example of the data structure of an effect check (room) table;

FIG. 31 is an explanatory view showing an example of the data structure of an effect check (individual) table;

FIG. 33 is an explanatory view showing an example of the data structure of an effect check (individual) table;

FIG. 34 is an explanatory view showing an example of the data structure of a proposal candidate selection table;

FIG. 35 is an explanatory view showing an example of the data structure of a proposal candidate selection table;

FIG. 40 is an explanatory view showing an example of a screen displayed in the second embodiment;

FIG. 42 is an explanatory view showing a processing example (2) in the modification; and FIG. 43 is a block diagram showing an example of the hardware configuration of a computer for realizing the present embodiment.

DETAILED DESCRIPTION

Hereinafter, examples of various embodiments suitable for realizing the invention will be described with reference to the accompanying drawings.

Figure 1:
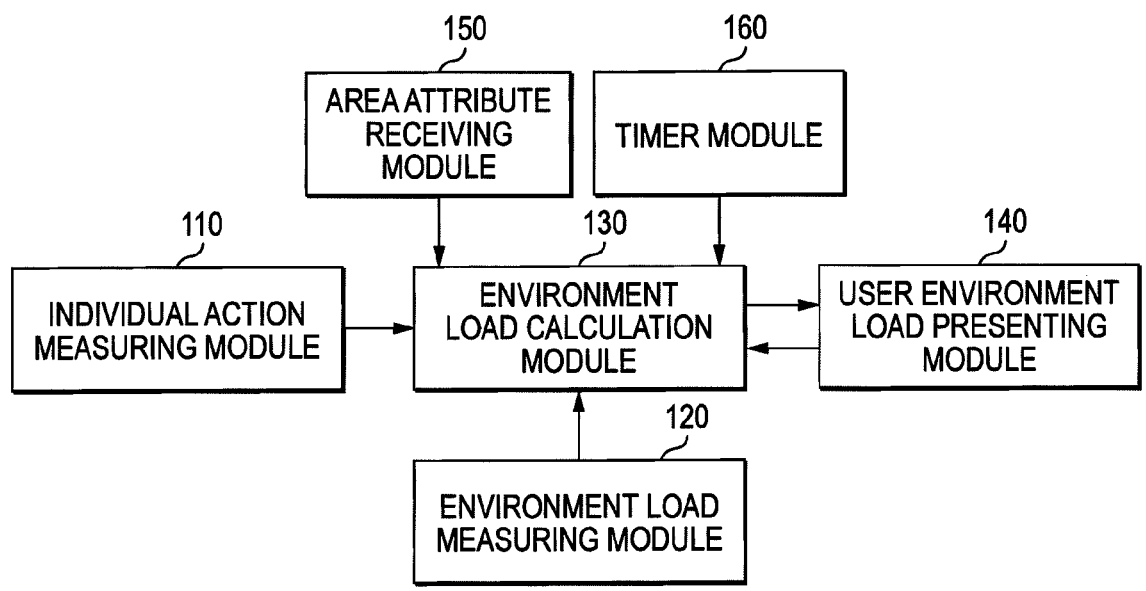
FIG. 1 is a view showing the conceptual module configuration in a configuration example of a first embodiment.

FIG. 1 is a view showing the conceptual module configuration in the configuration example of a first embodiment.

In addition, modules generally refer to logically separable components, such as software (computer program) and hardware. Therefore, the module in the present embodiment indicates not only a module in a computer program but also a module in the hardware configuration. Therefore, in the present embodiment, explanations on a computer program for making a computer function as these modules (a program for making a computer execute each procedure, a program for making a computer function as each means, and a program for making a computer realize each function), a system, and a method are also made. In addition, "store something", "cause something to be stored", and words equivalent thereto are used for convenience of explanation, and these words mean being stored in a storage device or performing a control to carry out storing in a storage device when the embodiment is a computer program. In addition, a module corresponds to a function in a one-to-one manner. However, one module may be realized using one program or a plurality of modules may be realized using one program. Alternatively, one module may be realized using a plurality of programs. In addition, a plurality of modules may be executed by one computer, or one module may be executed by a plurality of computers in a distribution or parallel environment. In addition, other modules may be included in one module. In addition, 'connection' as referred to hereinafter is used not only for physical connection but also for logical connection (for example, transmission and reception of data, instruction, and reference relationship between data). "Set in advance" refers to being set before target processing and is used as meaning including not only being set before the processing of the present embodiment starts but also being set after the processing of the present embodiment starts according to the situation and state at that time or according to the situation and state until then as long as it is before the target processing.

In addition, a system or an apparatus may be realized by connecting a plurality of computers, hardware, apparatuses, and the like to one another through a communication unit, such as a network (including communication connection of one-to-one correspondence), or may be realized using one computer, hardware, and an apparatus. The 'apparatus' and the 'system' are used as synonymous terms. Undoubtedly, a social "structure" (social system) which is an artificial agreement is not included in the "system".

Moreover, for every processing of each module or for multiple processing when the multiple processing is performed in a module, the target information is read from a storage device and the processing is performed and then the processing result is written into the storage device. Accordingly, explanations regarding the reading from a storage device before processing and writing into the storage device after processing may be omitted. In addition, examples of the storage device herein may include a hard disk, a RAM (Random Access Memory), an external storage device, a storage device using a communication line, and a register in a CPU (Central Processing Unit).

As shown in an example of FIG. 1, an information processing apparatus according to the present embodiment includes an individual action measuring module 110, an environment load measuring module 120, an environment load calculation module 130, a user environment load presenting module 140, an area attribute receiving module 150, and a timer module 160.

The individual action measuring module 110 is connected to the environment load calculation module 130. The individual action measuring module 110 measures the location information of each individual, who uses each area of a room (hereinafter, also referred to as an office; this is a concept including a workroom, a conference room, a classroom, an elevator hall, each floor of a building, and one building), using a sensor, such as an RFID (Radio Frequency IDentification), and provides it to the environment load calculation module 130. The measured information may be stored in an internal database. Here, the area is a region obtained by dividing a room. The regions may be located close to each other or may be separated from each other.

More specific explanation will be given below. The individual action measuring module 110 detects the location of a user in units of area. Then, the individual action measuring module 110 measures a use time (residence time) in units of area. As an implementation method, it is possible to use a measurement method, in which a receiver is provided in each area and a transmitter that transmits a unique ID to each user is provided using an RFID, a Bluetooth (registered trademark), or a wireless LAN, or a method of measuring the coordinates by three-point measurement, pulse delay, and the like to measure in which area each user is staying.

The data that the individual action measuring module 110 sends to the environment load calculation module 130 will be described using an area stay user table 900 illustrated in FIG. 9 and an area stay user table 1300 illustrated in FIG. 13.

The environment load measuring module 120 is connected to the environment load calculation module 130. The environment load measuring module 120 measures an environment load of each area of the office and provides it to the environment load calculation module 130. The measured information may be stored in an internal database.

A more specific example will be described below. The environment load measuring module 120 includes a wattmeter for each apparatus, and the information regarding a measurement result of the environment load measuring module 120 is mainly (1) an apparatus ID in the office, and (2) a list of data matched to the amount of environment load. In addition, the apparatus ID is an ID (IDentification), which is a reference numeral for identifying the apparatus (for example, an air conditioning apparatus or a lighting apparatus) uniquely in the present embodiment, and the amount of environment load means the amount of environment load required when using the apparatus. For example, $CO_2$ emissions (g) or power consumption (W) corresponds to the amount of environment load.

In addition, the apparatus may be a group of a plurality of apparatuses. For instance, the environment load of an office may have to be grasped only as a whole, for example, as a total amount of consumption of the whole office. Therefore, the amount of environment load of each divided area in the office may be measured as a value obtained by dividing the amount of environment load of the whole office by the area of the area. In this case, an apparatus ID in the environment load measuring module 120 is an area ID.

The environment load of an office may have to be grasped only as a period, for example, as a monthly or annual total amount of consumption. Therefore, the amount of environment load in units of several minutes based on the use of a user may be measured as a value obtained by dividing the monthly or annual amount of environment load by stay unit time. In addition, the amount of load may be set as an estimated value for each time zone, such as scheduled time (working hours), after scheduled time, and midnight and early morning, or the value may be differently set for work days and holidays in order to improve the precision in estimation.

Figure 3:
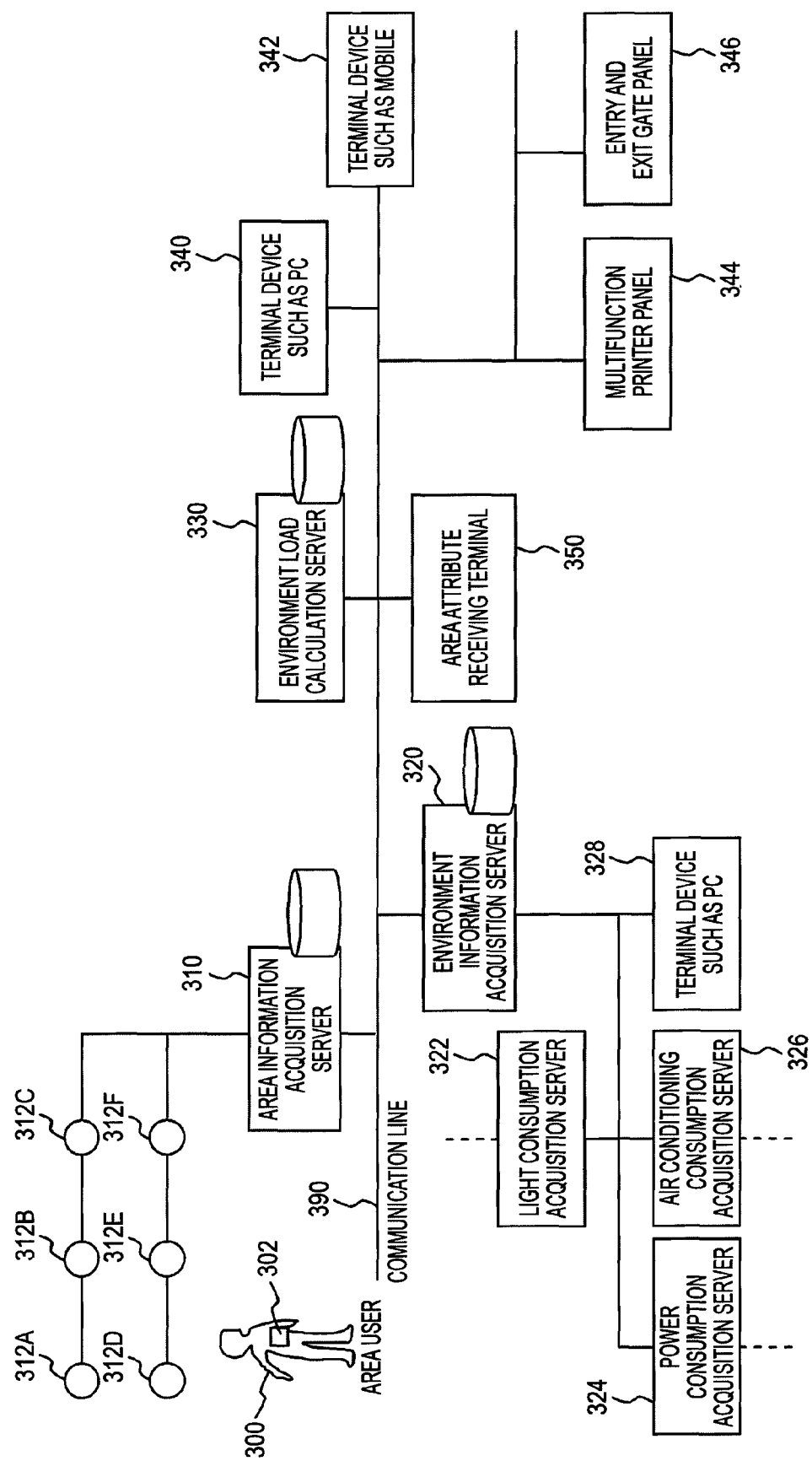
FIG. 3 is an explanatory view showing an example of the system configuration when the first embodiment is realized.

When the total amount of consumption of each office or area can be checked in detail, for example, as operating conditions of air conditioning in units of several minutes or as a lighting state of a lighting device, they may be totaled and added by an environment information acquisition server 320 illustrated in FIG. 3 and the unit time may be set to be shorter. For example, a day unit may be changed to a minute unit in order to improve the precision.

The environment load calculation module 130 is connected to the individual action measuring module 110, the environment load measuring module 120, the user environment load presenting module 140, the area attribute receiving module 150, and the timer module 160. The environment load calculation module 130 calculates the amount of environment load in each area in units of a user (individual) on the basis of the information measured by the individual action measuring module 110 and the environment load measuring module 120. The calculation result may be stored in an internal database. In addition, the calculation timing is controlled by the timer module 160. Examples of the module configuration and processing in the environment load calculation module 130 will be described later with reference to FIG. 2.

The user environment load presenting module 140 is connected to the environment load calculation module 130. The user environment load presenting module 140 sends to the environment load calculation module 130 a request for the information provided to each user and the area information and displays the amount of environment load of the user at that point in time, the amount of environment load when the user moves to another area which is an improvement proposal, the amount of environment load when the utilization conditions of an area are changed, and the like on a display device or the like provided in the information processing apparatus of the invention. The content of display will be described later with reference to FIG. 36 and the like.

The area attribute receiving module 150 is connected to the environment load calculation module 130. The area attribute receiving module 150 receives an attribute of an area. The attribute of an area is the information for making it possible for the environment load calculation module 130 to calculate the amount of environment load which changes with the utilization conditions.

A more specific example will be described below. The attribute of an area is the information of building/floor/room/division (span) of a room, lighting apparatus/air conditioning apparatus/distribution board (outlet) provided therein, and the like. For example, there are a floor information table 400, a room information table 500, and an area information table 600. These receive values set in advance. In addition, such received information is sent to the environment load calculation module 130.

FIG. 4 is an explanatory view showing an example of the data structure of the floor information table 400. The floor information table 400 has a floor ID column 410, a column 420 regarding the number of rooms, a list column 430, and a remarks column 440. In the floor ID column 410, a floor ID which is a reference numeral for identifying the floor uniquely in the present embodiment is stored. In the column 420 regarding the number of rooms, the number of rooms on the floor is stored. In the list column 430, a room ID which is a reference numeral for identifying the room uniquely in the present embodiment is stored. In the remarks column 440, the information regarding the floor is stored.

FIG. 5 is an explanatory view showing an example of the data structure of the room information table 500. The room information table 500 has a room ID column 510, an application column 520, a capacity column 530, an area column 540, a lighting division column 550, an air conditioning division column 560, and a distribution board (outlet) column 570. In the room ID column 510, a room ID which is a reference numeral for identifying the room uniquely in the present embodiment is stored. In the application column 520, the application (for example, a workroom or an elevator hall) of the room is stored. In the capacity column 530, the number of people who can be accommodated in the room is stored. In the area column 540, the information regarding an area included in the room is stored. In addition, the area column 540 has a number column 542 and an ID list column 544. In the number column 542, the number of areas in the room is stored. In the ID list column 544, an area ID which is a reference numeral for identifying an area in the room uniquely in the present embodiment is stored. In the lighting division column 550, the information regarding a lighting apparatus installed in the room is stored. In addition, the lighting division column 550 has a number column 552 and an apparatus ID list column 554. In the number column 552, the number of lighting apparatuses installed in the room is stored. In the apparatus ID list column 554, a lighting apparatus ID which is a reference numeral for identifying a lighting apparatus installed in the room uniquely in the present embodiment is stored. In the air conditioning division column 560, the information regarding an air conditioning apparatus installed in the room is stored. In addition, the air conditioning division column 560 has a number column 562 and an apparatus ID list column 564. In the number column 562, the number of air conditioning apparatuses installed in the room is stored. In the apparatus ID list column 564, an air conditioning apparatus ID which is a reference numeral for identifying an air conditioning apparatus installed in the room uniquely in the present embodiment is stored. In the distribution board (outlet) column 570, the information regarding a distribution board (outlet) installed in the room is stored. In addition, the distribution board (outlet) column 570 has a number column 572 and an apparatus ID list column 574. In the number column 572, the number of distribution boards installed in the room is stored. In the apparatus ID list column 574, a distribution board ID which is a reference numeral for identifying a distribution board installed in the room uniquely in the present embodiment is stored.

FIG. 6 is an explanatory view showing an example of the data structure of the area information table 600. In the area information table 600, the data necessary for calculating the power consumption, which is an environment load, for every area is stored. In addition, if it is determined how many persons are actually present in the area, the power consumption of one person can be calculated. Therefore, the area information table 600 has an area ID column 610, a capacity column 620, a lighting column 630, an air conditioning column 640, and a distribution board (outlet) column 650. In the area ID column 610, an area ID which is a reference numeral for identifying an area uniquely in the present embodiment is stored. In the capacity column 620, the number of people who can be accommodated in the area is stored. In the lighting column 630, the information regarding a lighting apparatus installed in the area is stored. In addition, the lighting column 630 has an apparatus ID column 632 and a power consumption column 634. In the apparatus ID column 632, a lighting apparatus ID which is a reference numeral for identifying a lighting apparatus installed in the area uniquely in the present embodiment is stored. In the power consumption column 634, the power consumption (Wh) which is an environment load when the lighting apparatus is used is stored. In the air conditioning column 640, the information regarding an air conditioning apparatus installed in the area is stored. In addition, the air conditioning column 640 has an apparatus ID column 642 and a column regarding a proportional division value of power consumption 644. In the apparatus ID column 642, an air conditioning apparatus ID which is a reference numeral for identifying an air conditioning apparatus installed in the area uniquely in the present embodiment is stored. In the column regarding a proportional division value of power consumption 644, the proportional division value of power consumption (measured value) which is an environment load when the air conditioning apparatus is used is stored. In the distribution board (outlet) column 650, the information regarding a distribution board installed in the area is stored. In addition, the distribution board (outlet) column 650 has an apparatus ID column 652 and a column regarding a proportional division method of power consumption 654. In the apparatus ID column 652, a distribution board ID which is a reference numeral for identifying a distribution board installed in the area uniquely in the present embodiment is stored. In the column regarding a proportional division method of power consumption 654, a proportional division method of power consumption (measured value) which is an environment load when the distribution board is used is stored. In the expression as a proportional division method stored in the column regarding a proportional division method of power consumption 654, proportional division according to the number of people (value of a column regarding the number of users 930) is applied.

In addition, the column regarding a proportional division value of power consumption 644 and the column regarding a proportional division method of power consumption 654 designate a proportional division method of each area when the measurement range of power consumption and the area do not match each other (when one air conditioning apparatus is used in a plurality of areas, when a plurality of air conditioning apparatuses is used in one area, and when a plurality of air conditioning apparatuses is used in a plurality of areas). For example, an area 1001-b is located in the boundary of an air conditioning apparatus and a distribution board, air conditioning and electric power are supplied to the area 1001-b from air conditioning apparatuses A1001 and A1002 and distribution boards E1001 and E1002. Similarly, to an area 1003-b, air conditioning and electric power from air conditioning apparatuses A1004 and A1005 and distribution boards E1004 and E1005 are supplied. In addition, areas 1002-a and 1002-b are divided as areas, but the same lighting apparatus, air conditioning apparatus, and distribution board are used therein. In addition, an area 10E1-a (elevator hall) is a case where the measurement range of power consumption and the area match each other. In this case, 1 is stored in the column regarding a proportional division value of power consumption 644 and the column regarding a proportional division method of power consumption 654.

The timer module 160 is connected to the environment load calculation module 130. The timer module 160 controls a calculation interval of the environment load calculation module 130. Specifically, the timer module 160 performs calculation instruction (interruption) at fixed intervals. Even though the real-time efficiency is improved as the interval decreases, the interval may be set according to the data update interval of the individual action measuring module 110, the environment load measuring module 120, and the area attribute receiving module 150. In addition, it may be an intermittent interval instead of the fixed interval.

Figure 2:
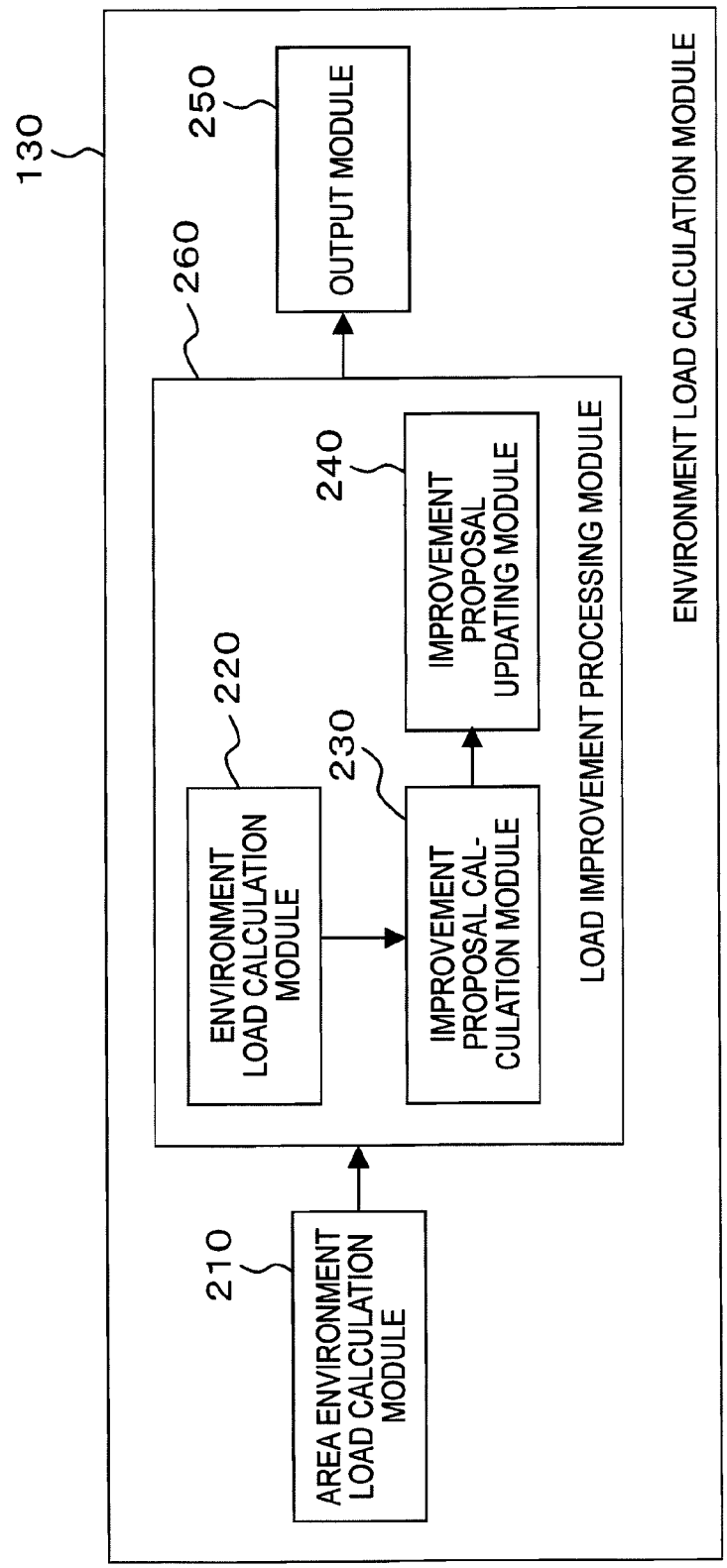
FIG. 2 is a view showing the conceptual module configuration in a configuration example of an environment load calculation module in the first embodiment.

FIG. 2 is a view showing the conceptual module configuration in the configuration example of the environment load calculation module 130 in the first embodiment. The environment load calculation module 130 has an area environment load calculation module 210, an output module 250, and a load improvement processing module 260.

The area environment load calculation module 210 is connected to the load improvement processing module 260. The area environment load calculation module 210 receives the information from the individual action measuring module 110, the environment load measuring module 120, and the area attribute receiving module 150 and calculates the environment load in an area in a room.

The load improvement processing module 260 is connected to the area environment load calculation module 210 and the output module 250, and has an environment load calculation module 220, an improvement proposal calculation module 230, and an improvement proposal updating module 240.

The environment load calculation module 220 is connected to the improvement proposal calculation module 230. The environment load calculation module 220 calculates an environment load for every user (individual) staying in the area on the basis of the information from the individual action measuring module 110 and the environment load calculated by the area environment load calculation module 210.

The improvement proposal calculation module 230 is connected to the environment load calculation module 220 and the improvement proposal updating module 240. On the basis of a policy set in advance in order to reduce the environment load which is obtained from the calculation result of the area environment load calculation module 210 and the environment load calculation module 220, the improvement proposal calculation module 230 calculates an environment load of each user when the policy is adopted. As a policy set in advance, a user's seating position may be moved and the operation of an air conditioning apparatus or a lighting apparatus in the area where no user is present due to the movement may be stopped. Moreover, as a policy set in advance, the air conditioning apparatus in the area in the room may be adjusted. Moreover, as a policy set in advance, the lighting apparatus in the area in the room may be adjusted. As adjustments of the air conditioning apparatus and the lighting apparatus, there are brightness adjustment and hue adjustment as examples of adjustment of the lighting apparatus and temperature adjustment and air volume adjustment as examples of adjustment of the air conditioning apparatus in addition to the starting or stopping of operation (ON/OFF of power supply) of the air conditioning apparatus or the lighting apparatus in the area.

In addition, the improvement proposal calculation module 230 compares the environment load calculated by the environment load calculation module 220 with the environment load calculated as described above by the improvement proposal calculation module 230. Then, the improvement proposal calculation module 230 determines whether to output a policy to be proposed on the basis of the number of users, whose environment loads are reduced, among users, which is obtained as a result of the comparison.

The improvement proposal updating module 240 is connected to the improvement proposal calculation module 230. The improvement proposal updating module 240 makes the area environment load calculation module 210, the environment load calculation module 220, the improvement proposal calculation module 230, and the output module 250 perform the processing again when it becomes a situation set in advance. The "situation set in advance" will be described later.

The output module 250 is connected to the load improvement processing module 260. When it is determined that there is an output from the improvement proposal updating module 240, the output module 250 outputs the calculation results of the environment load calculation module 220 and the improvement proposal calculation module 230 to the user environment load presenting module 140.

FIG. 3 is an explanatory view showing an example of the system configuration when the first embodiment is realized. An area information acquisition server 310, an environment information acquisition server 320, an environment load calculation server 330, a terminal device 340 such as a PC, a terminal device 342 such as a mobile, a multifunction printer panel 344, an entry and exit gate panel 346, and an area attribute receiving terminal 350 are connected to each other through a communication line 390. In addition, area sensors 312A to 312F are connected to the area information acquisition server 310. A light consumption acquisition server 322, a power consumption acquisition server 324, an air conditioning consumption acquisition server 326, and a terminal device 328 such as a PC are connected to the environment information acquisition server 320.

If this is compared with the module configuration illustrated in FIG. 1, the area information acquisition server 310 and the area sensors 312A to 312F correspond to the individual action measuring module 110; the environment information acquisition server 320, the light consumption acquisition server 322, the power consumption acquisition server 324, the air conditioning consumption acquisition server 326, and the terminal device 328 such as a PC correspond to the environment load measuring module 120; the environment load calculation server 330 corresponds to the environment load calculation module 130; the terminal device 340 such as a PC, the terminal device 342 such as a mobile, the multifunction printer panel 344, and the entry and exit gate panel 346 correspond to the user environment load presenting module 140; and the area attribute receiving terminal 350 corresponds to the area attribute receiving module 150.

The area sensors 312A to 312F are installed in each area or other locations and detect a tag 302 that an area user 300 has. Each of the area sensors 312A to 312F has positional information. Therefore, detection of the tag 302 means that it has been detected that the area user 300 with the tag 302 stayed at the position. An ID (user ID) of the detected tag 302 and detection date and time are transmitted to the area information acquisition server 310. Being unable to detect the tag 302 indicates that the area user 300 with the tag 302 left the area or the like. Accordingly, this means that the area user 300 with the tag 302 had stayed in the area or the like during a period from date and time when the tag 302 was detected to date and time when the tag 302 could not be detected. The area information acquisition server 310 acquires the positional information of the area user 300, who has the tag 302, together with the time information.

Each of the light consumption acquisition server 322, the power consumption acquisition server 324, the air conditioning consumption acquisition server 326, and the terminal device 328 such as a PC measure the power consumption. Then, the environment information acquisition server 320 acquires the power consumption measured by the light consumption acquisition server 322, the power consumption acquisition server 324, the air conditioning consumption acquisition server 326, and the terminal device 328 such as a PC. In addition, the terminal device 328 such as a PC is an example for power consumption measurement of a personally used outlet.

The terminal device 340 such as a PC, the terminal device 342 such as a mobile, the multifunction printer panel 344, and the entry and exit gate panel 346 present the amount of environment load, the content of improvement proposal, and the like. For example, when a user enters a room, the position of a seat which is the content of improvement proposal is displayed on a display device provided in the entry and exit gate panel 346. The terminal device 340 such as a PC can specify an individual by a login ID, the terminal device 342 such as a mobile can specify an individual by an owner, and the multifunction printer panel 344 and the entry and exit gate panel 346 can specify an individual by the tag 302 that the area user 300 has.

Figure 7:
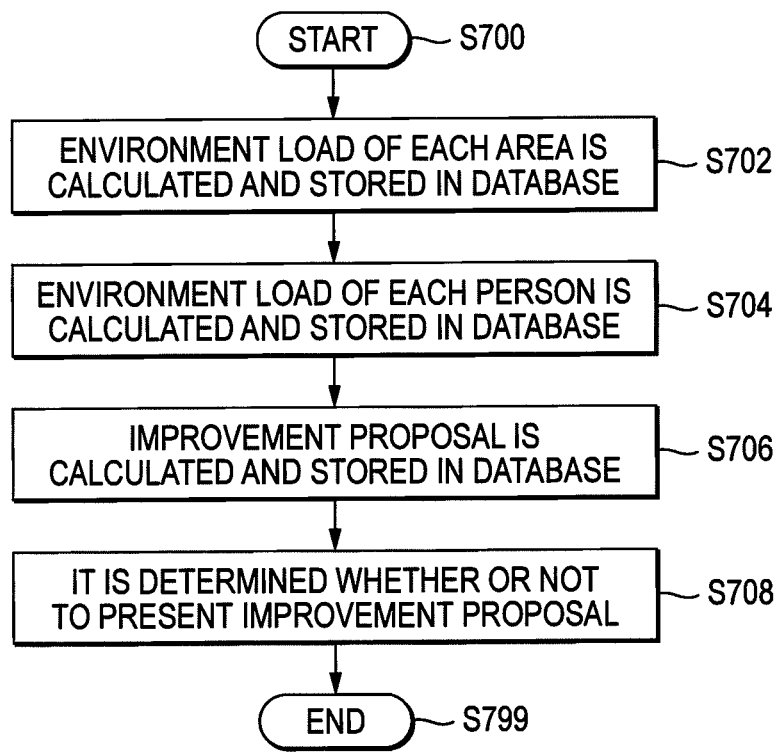
FIG. 7 is a flow chart showing an example of processing performed by an environment load calculation module in the first embodiment.

FIG. 7 is a flow chart showing an example of processing performed by the environment load calculation module 130 in the first embodiment. In addition, this processing is started by an instruction from the timer module 160.

In step S702, the area environment load calculation module 210 calculates an environment load of each area and stores it in a database.

In step S704, the environment load calculation module 220 calculates an environment load of each person in each area and stores it in a database. In addition, the number of people staying in each area is received from the individual action measuring module 110.

In step S706, the improvement proposal calculation module 230 calculates an improvement proposal and stores it in a database.

In step S708, it is determined whether or not the improvement proposal updating module 240 will present an improvement proposal.

Figure 8:
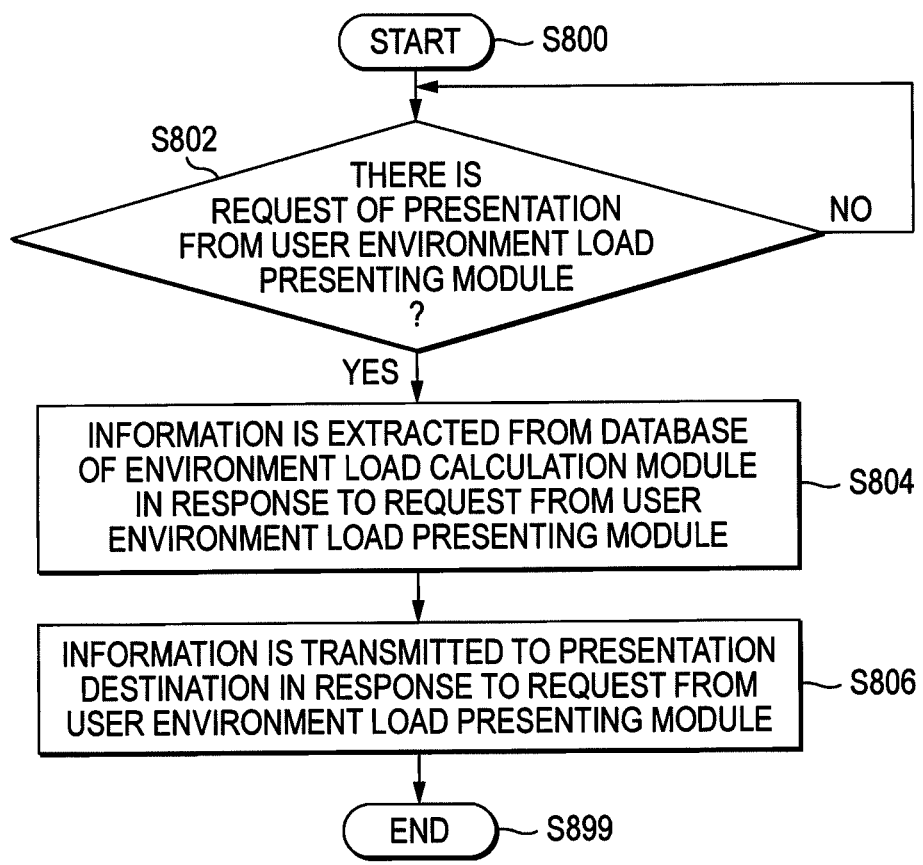
FIG. 8 is a flow chart showing an example of processing performed by an output module in the first embodiment.

FIG. 8 is a flow chart showing an example of processing performed by the output module 250 in the first embodiment.

In step S802, it is determined whether or not there is a request of presentation from the user environment load presenting module 140. When there is a request, the process proceeds to step S804. In other cases, the processing in step S802 is performed again.

In step S804, in response to the request from the user environment load presenting module 140, the information is extracted from the database of the environment load calculation module 130.

In step S806, the information is transmitted to the presentation destination in response to the request from the user environment load presenting module 140.

In addition, the information (calculation result in steps S702, S704, and S706) stored in a database may be presented without performing the processing in step S802.

Next, details of processing of the area environment load calculation module 210 will be described.

(1) The area environment load calculation module 210 acquires the number of users, who are staying in each area at a certain time t, from the individual action measuring module 110. For example, the area stay user table 900 is acquired. FIG. 9 is an explanatory view showing an example of the data structure of the area stay user table 900. The area stay user table 900 has an area ID column 910, a user ID list column 920, a column regarding the number of users 930, and an update time column 940. In the area ID column 910, an area ID which is a reference numeral for identifying an area uniquely in the present embodiment is stored. In the user ID list column 920, a user ID of a user staying in the area is stored. In the column regarding the number of users 930, the number of users (the number of user IDs stored in the user ID list column 920) is stored. In the update time column 940, an update time is stored. The update time indicates that a user staying in the area at the update time has been detected.

(2) The area environment load calculation module 210 acquires the amount of environment load of each apparatus at a certain time t from the environment load measuring module 120. For example, an apparatus environment load table 1000 is acquired. FIG. 10 is an explanatory view showing an example of the data structure of the apparatus environment load table 1000. The apparatus environment load table 1000 has an apparatus ID column 1010, a type column 1020, a state column 1030, a power consumption column 1040, and an update time column 1050. In the apparatus ID column 1010, an apparatus ID which is a reference numeral for identifying an apparatus (for example, a lighting apparatus, an air conditioning apparatus, or an outlet) uniquely in the present embodiment is stored. In the type column 1020, a type (for example, a lighting apparatus, an air conditioning apparatus, or an outlet) of the apparatus is stored. In the state column 1030, a state (for example, a use state (ON/OFF) or unused (-)) of the apparatus is stored. In the power consumption column 1040, the power consumption (measured value or fixed value set in advance) of the apparatus is stored. In the update time column 1050, an update time is stored. The update time indicates that the state and power consumption of the apparatus at the update time has been detected.

(3) The area environment load calculation module 210 assigns an environment load to each area on the basis of the above-described (1) and (2) and the information (area information table 600 illustrated in FIG. 6) from the area attribute receiving module 150. This processing result becomes an area proportional division result table 1100, for example. FIG. 11 is an explanatory view showing an example of the data structure of the area proportional division result table 1100. The area proportional division result table 1100 has an apparatus ID column 1110, a measured power consumption column 1120, an area ID column 1130, a power consumption column 1140, and an update time column 1150. In the apparatus ID column 1110, an apparatus ID which is a reference numeral for identifying an apparatus (for example, a lighting apparatus, an air conditioning apparatus, or an outlet) uniquely in the present embodiment is stored. In the measured power consumption column 1120, power consumption of the apparatus is stored. In the area ID column 1130, an area ID which is a reference numeral for identifying an area, in which the apparatus is installed, uniquely in the present embodiment is stored. In the power consumption column 1140, power consumption of the apparatus in the area is stored. The value of the measured power consumption column 1120 is calculated by applying the proportional division value of the column regarding a proportional division value of power consumption 644 and the proportional division method of the column regarding a proportional division method of power consumption 654 of the area information table 600. In the update time column 1150, an update time is stored.

In addition, the area environment load calculation module 210 creates an area environment load calculation result table 1200 from the area proportional division result table 1100. That is, this means calculating $CO_2$ emissions at a certain time (update time) in each area. FIG. 12 is an explanatory view showing an example of the data structure of the area environment load calculation result table 1200. The area environment load calculation result table 1200 summarizes the area proportional division result table 1100 for every area ID. The area environment load calculation result table 1200 has an area ID column 1210, a power consumption column 1220, a column regarding the amount of environment load 1230, and an update time column 1240. In the area ID column 1210, an area ID which is a reference numeral for identifying an area uniquely in the present embodiment is stored. In the power consumption column 1220, power consumption in the area is stored. The power consumption column 1220 has an apparatus ID column 1222, a proportional division column 1224, and a total column 1226. In the apparatus ID column 1222, an apparatus ID which is a reference numeral for identifying an apparatus installed in the area uniquely in the present embodiment is stored. In the proportional division column 1224, power consumption proportionally divided for the area of the power consumption of the apparatus is stored. In the total column 1226, the total power consumption of an apparatus installed in the area is stored. In the column regarding the amount of environment load 1230, the amount of $CO_2$ generated by power consumption of the total column 1226 is stored. Although a coefficient used to convert electric energy into $CO_2$ changes according to the electric power company or over the years, it is calculated using an expression of 1 kWh=$0.555CO_2$ kg/h, for example. In the update time column 1240, an update time is stored.

Next, details of processing of the environment load calculation module 220 will be described.

(1) The environment load calculation module 220 acquires the number of users, who are staying in each area at the time t, from the individual action measuring module 110. For example, the area stay user table 1300 is acquired. FIG. 13 is an explanatory view showing an example of the data structure of the area stay user table 1300. The area stay user table 1300 has an area ID column 1310, a user ID list column 1320, a column regarding the number of users 1330, and an update time column 1340. This is the same as the area stay user table 900 illustrated in FIG. 9.

Figure 14:
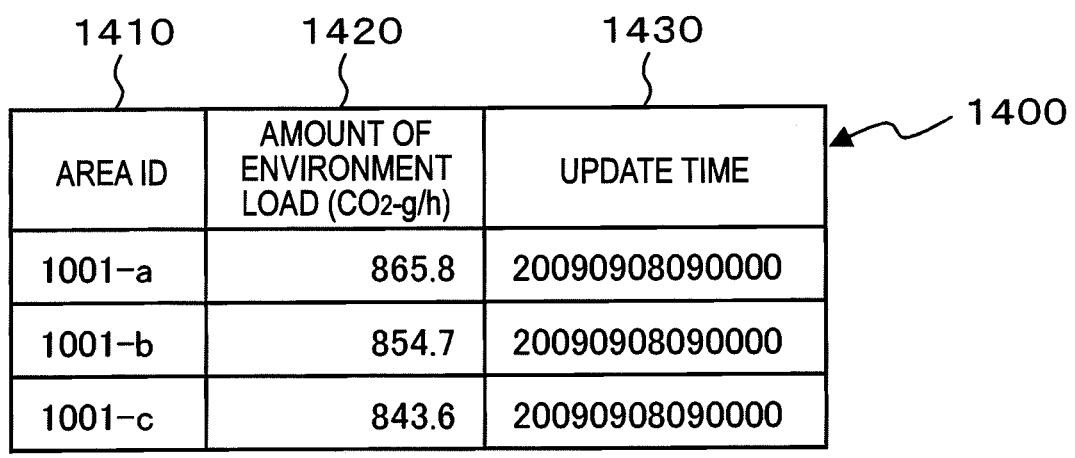
FIG. 14 is an explanatory view showing an example of the data structure of an area environment load table.

(2) The environment load calculation module 220 acquires the amount of environment load of each area at the time t from the area environment load calculation module 210. For example, an area environment load table 1400 is acquired. FIG. 14 is an explanatory view showing an example of the data structure of the area environment load table 1400. The area environment load table 1400 has an area ID column 1410, a column regarding the amount of environment load 1420, and an update time column 1430. This is obtained by extracting the area ID column 1210, the column regarding the amount of environment load 1230, and the update time column 1240 from the area environment load calculation result table 1200 illustrated in FIG. 12.

(3) The environment load calculation module 220 assigns a result, which is obtained by dividing the amount of environment load of each area at the time t by the number of users on the basis of the information from the above-described (1) and (2), to each personal ID and sets it as the amount of environment load of each individual at the time t.

The explanation will be given using an example. The environment load calculation module 220 mixes the area stay user table 1300 illustrated in FIG. 13 and the area environment load table 1400 illustrated in FIG. 14 to create an area stay user environment load table 1500. FIG. 15 is an explanatory view showing an example of the data structure of the area stay user environment load table 1500. The area stay user environment load table 1500 has an area ID column 1510, a user ID list column 1520, a column regarding the number of users 1530, a column regarding the amount of environment load 1540, and an update time column 1550. In the area ID column 1510, an area ID which is a reference numeral for identifying an area uniquely in the present embodiment is stored. In the user ID list column 1520, a user ID of a user staying in the area is stored. In the column regarding the number of users 1530, the number of users (the number of user IDs stored in the user ID list column 1520) is stored. In the column regarding the amount of environment load 1540, the amount of $CO_2$ generated by an apparatus installed in the area is stored. In the update time column 1550, an update time is stored. In addition, the area stay user environment load table 1500 is obtained by extracting the user ID list column 1320 as the user ID list column 1520, extracting the column regarding the number of users 1330 as the column regarding the number of users 1530, and extracting the column regarding the amount of environment load 1420 as the column regarding the amount of environment load 1540, from rows in which the area ID columns 1310 and 1410 match each other and the update time columns 1340 and 1430 match each other.

Then, the environment load calculation module 220 creates an environment load table for every user 1600 from the area stay user environment load table 1500. FIG. 16 is an explanatory view showing an example of the data structure of the environment load table for every user 1600. The environment load table for every user 1600 has a user ID column 1610, an area ID column 1620, a column regarding the amount of environment load of each person 1630, and an update time column 1640. In the user ID column 1610, a user ID which is a reference numeral for identifying a user uniquely in the present embodiment is stored. In the area ID column 1620, an area ID of the area where the user is staying is stored. In the column regarding the amount of environment load of each person 1630, the amount of $CO_2$ assigned when the user stays in the area is stored. In addition, this value is calculated by dividing the value of the column regarding the amount of environment load 1540 by the value of the column regarding the number of users 1530. In the update time column 1640, an update time is stored.

Next, details of processing of the improvement proposal calculation module 230 will be described.

Figure 17:
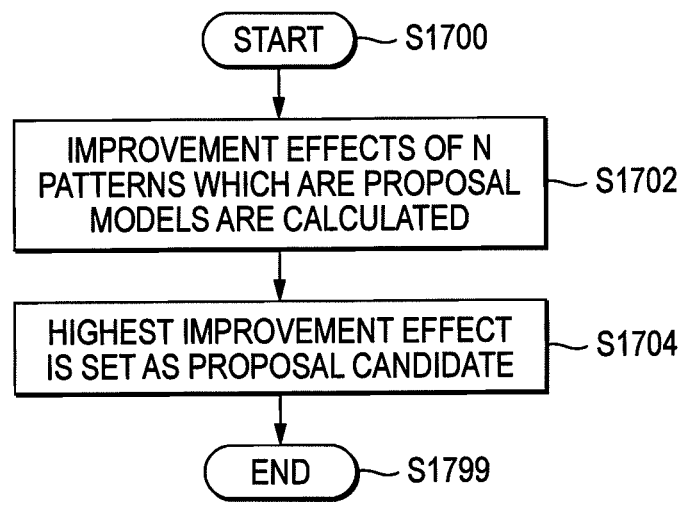
FIG. 17 is a flow chart showing an example of processing performed by an improvement proposal calculation module in the first embodiment.

FIG. 17 is a flow chart showing an example of processing performed by the improvement proposal calculation module 230 in the first embodiment.

In step S1702, improvement effects of N patterns which are proposal models are calculated.

In step S1704, the highest improvement effect is set as a proposal candidate.

The following proposal models are used in step S1702.

(A) Proposal for environment load reduction based on the movement (concentration) of a seating position The following can be realized by the movement of a seating position.

(A-1) Environment load reduction based on the optimization of a lighting apparatus (stopping of an operation of a lighting apparatus in an area after movement (area where there is no resident))

(A-2) Environment load reduction based on the optimization of an air conditioning apparatus (stopping of an operation of an air conditioning apparatus in an area after movement (area where there is no resident))

Figure 18:
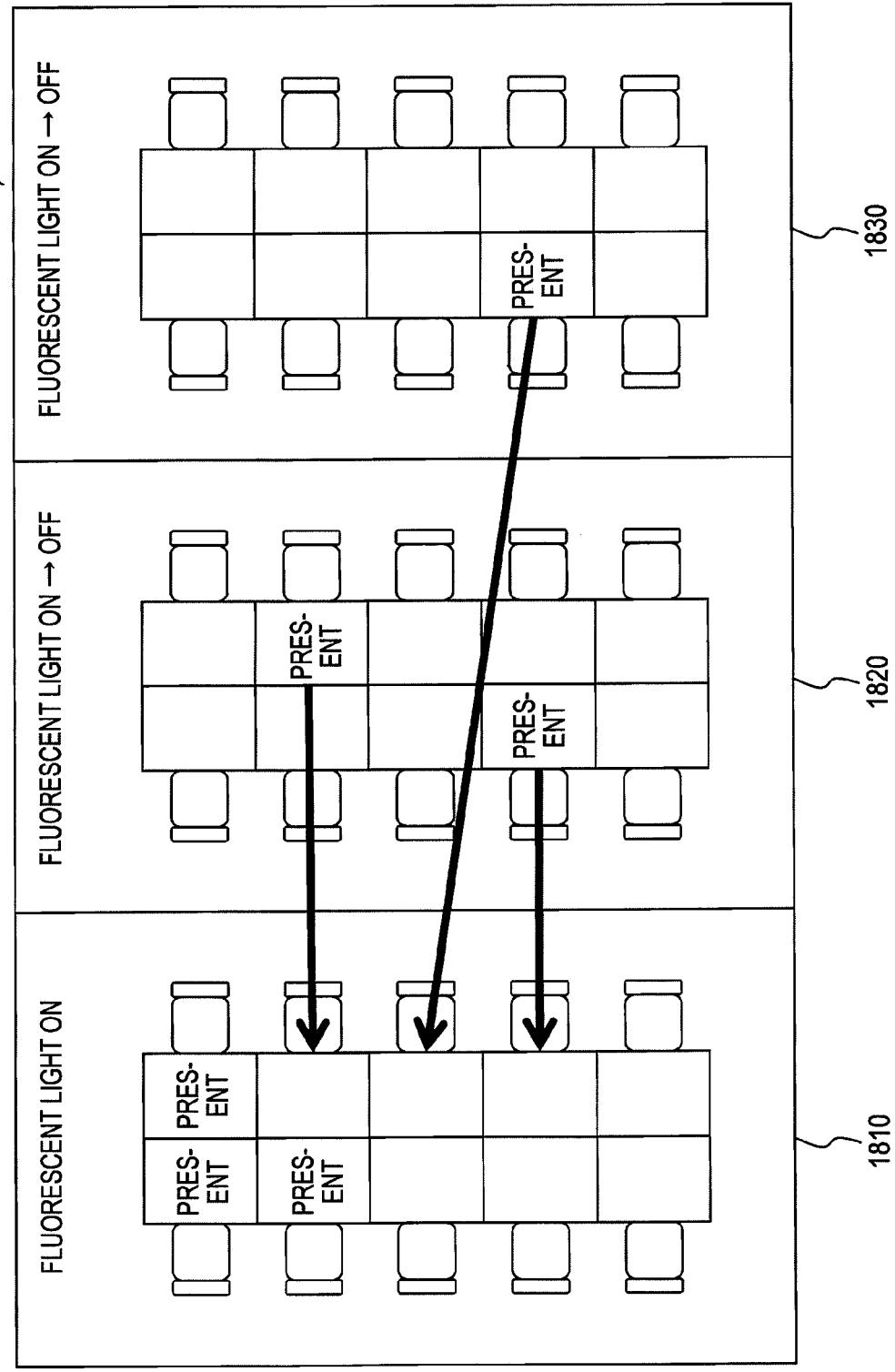
FIG. 18 is an explanatory view showing an example of processing in the first embodiment.

For example, the movement of a seat shown in FIG. 18 will be described. A room 1800 is divided into areas 1810, 1820, and 1830. In overtime hours, six persons work in this room 1800. It is proposed that persons present in the areas 1820 and 1830 are moved to the area 1810 (persons present in the areas 1810 and 1820 may be moved to the area 1830) and switching to individual area lighting is made.

(B) Proposal for environment load reduction based on the adjustment of an air conditioning apparatus Examples of the proposal include stopping the operation of an air conditioning apparatus, reducing the set temperature (reducing the set temperature in the case of heating and raising the set temperature in the case of cooling), and stopping the operations of all air conditioning apparatuses and performing switching to an individual air conditioning apparatus (spot cooling, an infrared heater, and the like) provided in the seat.

(C) Proposal for environment load reduction based on the adjustment of a lighting apparatus Examples of the proposal include stopping the operation of a lighting apparatus, darkening the light (in addition, a lighting apparatus in a hallway may be lighted for safety), and stopping the operation of a lighting apparatus on the ceiling and performing switching to an individual lighting apparatus provided in the seat.

Moreover, examples of the combination of proposals for environment load reduction include P1: (A), P2: (B), P3: (C), P4: (A)+(B), P5: (A)+(C), P6: (B)+(C), and P7: (A)+(B)+(C). In this case, the N patterns are seven patterns.

The calculation of improvement effects when the proposal described in (A) is performed, which is performed by the improvement proposal calculation module 230, will be described using an improvement proposal information table 1900 illustrated in FIG. 19. The improvement proposal information table 1900 is a table created by a calculation result.

The improvement proposal calculation module 230 performs the following processing (processing of verifying the effective use of a space).

(1) The number of users staying in each area at the time t is acquired from the individual action measuring module 110 (column regarding the number of users 1930 of the improvement proposal information table 1900).

(2) The capacity of each room is acquired from (1) and the area attribute receiving module 150 (capacity column 1920 of the improvement proposal information table 1900).

(3) An area list of a room and the capacity of each area are acquired from the area attribute receiving module 150 for every room (ID list column 1942 and capacity column 1944 of the improvement proposal information table 1900).

(4) The capacity of each area is subtracted from the number of users of each room until "capacity of the area">"rest of users" is satisfied (column regarding "number of users"–"capacity" 1946 of the improvement proposal information table 1900).

(5) In this case, if an area still remains, packing is possible (packing possibility column 1948 of the improvement proposal information table 1900). That is, an area whose value of the column regarding "number of users"–"capacity" 1946 is negative is an area where packing is possible.

(6) For the other areas, a flag indicating that the area is not used in improvement proposals (No in a column regarding an area used after improvements 1950) is set.

In addition, if the same thing is performed on the floor, the movement of a room can be proposed.

As an adjustment to leave a margin on the seat, for example, the value of "capacity–1" (adjusted by the size of an area, for example) may be set by the area attribute receiving module 150.

The following processing differs depending on the proposal.

P1: Case of "(A) proposal for environment load reduction based on the movement (concentration) of a seating position"

(7) The amount of environment load of each area at the time t is acquired from the area environment load calculation module 210.

(8) An apparatus ID which is not used is specified from (6) and the area attribute receiving module 150 and the amount of environment load is set to zero. In this case, certain distribution board power value may be appended to each area where it is used by proportional division.

(9) The expected amount of load of each area is calculated on the basis of the information of (6) similar to the area environment load calculation module 210. As a result, an effect check (room) table 2000 illustrated in FIG. 20 is created. An area ID column 2010 and a current state column 2020 of the effect check (room) table 2000 correspond to the area ID column 1210 and the power consumption column 1220 of the area environment load calculation result table 1200, respectively. In addition, the value in a power consumption column 2032 of the effect check (room) table 2000 is a calculation result of the power consumption of each apparatus in the area after improvements, and the value in a column regarding the amount of environment load 2040 is calculated similar to that in the column regarding the amount of environment load 1230 of the area environment load calculation result table 1200.

(10) The expected amount of load of each person is calculated on the basis of the information of (9) similar to the environment load calculation module 220. As a result, an effect check (individual) table 2100 illustrated in FIG. 21 is created. A personal ID column 2110, an area ID column 2122, and a column regarding the amount of environment load 2124 of the effect check (individual) table 2100 correspond to the user ID column 1610, the area ID column 1620, and the column regarding the amount of environment load of each person 1630 of the environment load table for every user 1600, respectively. In addition, the value in an improvement prediction column 2130 of the effect check (individual) table 2100 is a calculation result of $CO_2$ emissions of a user in the area after improvements, and the value in a column regarding the amount of environment load 2134 is calculated similar to that in the column regarding the amount of environment load of each person 1630 of the environment load table for every user 1600. In addition, the value in parentheses in the column regarding the amount of environment load 2134 is a value when the total load is assigned to an individual.

P2: Case of "(B) proposal for environment load reduction based on the adjustment of an air conditioning apparatus"

(7) The amount of environment load of each area at the time t is acquired from the area information acquisition server 310.

(8) An air conditioning apparatus ID which is not used is specified from the area attribute receiving module 150 and the amount of environment load is set to zero. In this case, the minimum amount of environment load required for an operation may be set. In addition, an apparatus whose power consumption increases is specified and a predetermined value is added. In this case, certain distribution board power value may be appended to each area where it is used by proportional division. In this example, electric energy of A1001 and A1002 is set to zero. In addition, electric power of the distribution board is increased by 500 Wh per person by individual air conditioning.

(9) The expected amount of load of each area is calculated similar to the area environment load calculation module 210. As a result, an effect check (room) table 2200 illustrated in FIG. 22 is created. The effect check (room) table 2200 has the same configuration as the effect check (room) table 2000 illustrated in FIG. 20.

Figure 23:
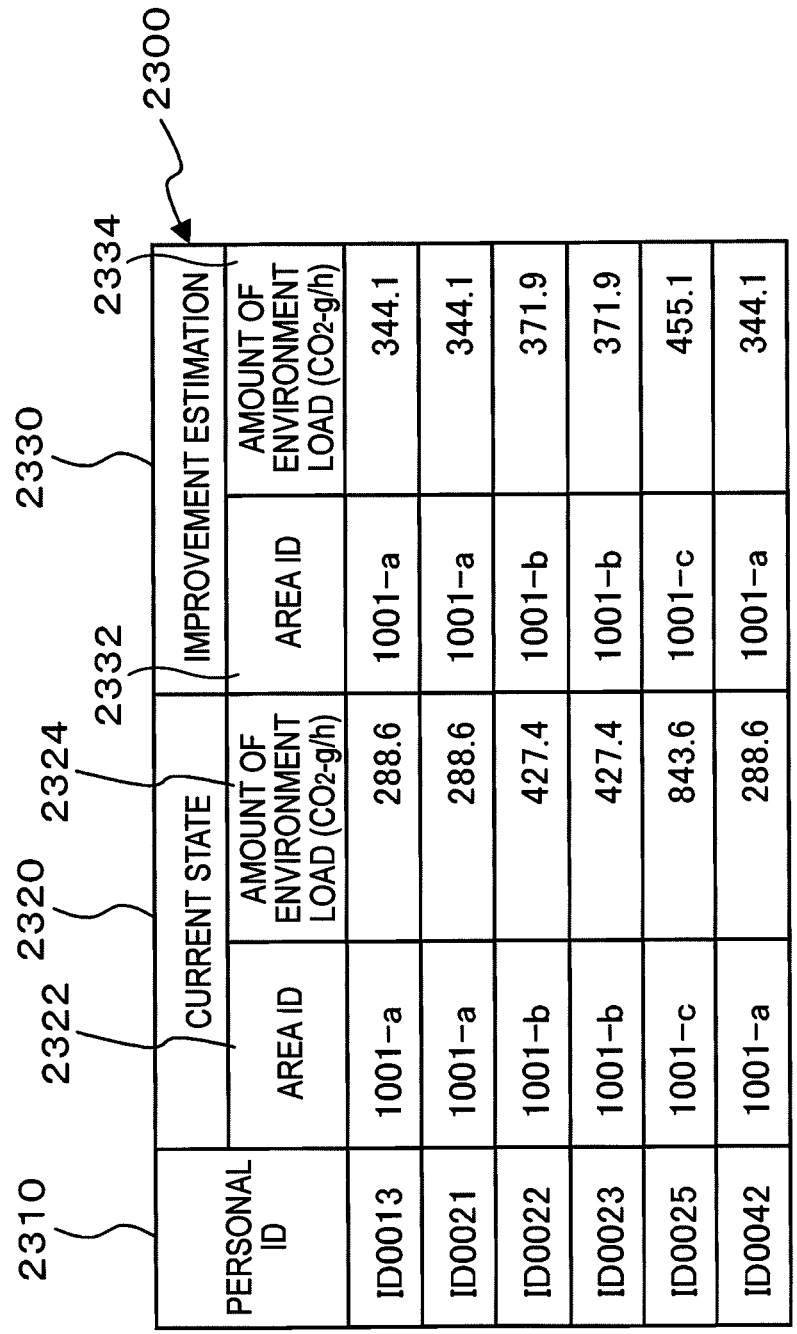
FIG. 23 is an explanatory view showing an example of the data structure of an effect check (individual) table.

(10) The expected amount of load of each person is calculated on the basis of the information of (9) similar to the environment load calculation module 220. As a result, an effect check (individual) table 2300 illustrated in FIG. 23 is created. The effect check (individual) table 2300 has the same configuration as the effect check (individual) table 2100 illustrated in FIG. 21.

P3: Case of "(C) proposal for environment load reduction based on the adjustment of a lighting apparatus"

(7) The amount of environment load of each area at the time t is acquired from the area information acquisition server 310.

(8) A lighting apparatus ID which is not used is specified from the area attribute receiving module 150 and the amount of environment load is set to zero. In this case, the amount of environment load may not be zero due to lighting required for a hallway and the like. In addition, an apparatus whose power consumption increases is specified and a predetermined value is added. In this case, certain distribution board power value may be appended to each area where it is used by proportional division. In this example, 30 Wh is left for each of L1001-*a*, L1001-*b*, and L1001-*c* and the management is performed by the area attribute receiving module 150. In addition, electric power of the distribution board is increased by 30 Wh per person by introduction of individual lighting.

(9) The expected amount of load of each area is calculated similar to the area environment load calculation module 210. As a result, an effect check (room) table 2400 illustrated in FIG. 24 is created. The effect check (room) table 2400 has the same configuration as the effect check (room) table 2000 illustrated in FIG. 20.

(10) The expected amount of load of each person is calculated on the basis of the information of (9) similar to the environment load calculation module 220. As a result, an effect check (individual) table 2500 illustrated in FIG. 25 is created. The effect check (individual) table 2500 has the same configuration as the effect check (individual) table 2100 illustrated in FIG. 21.

P4: Case of "(A) proposal for movement of a seat+(B) proposal for adjustment of an air conditioning apparatus"

(7) The amount of environment load of each area at the time t is acquired from the area information acquisition server 310.

(8) An apparatus ID which is not used is specified from (6) and the area attribute receiving module 150 and the amount of environment load is set to zero. In this case, the minimum amount of environment load required for an operation may be set. In addition, an apparatus whose power consumption increases is specified and a predetermined value is added. In this case, certain distribution board power value may be appended to each area where it is used by proportional division. In this example, electric energy of A1001 and A1002 is set to zero. In addition, electric power of the distribution board is increased by 500 Wh per person by individual air conditioning.

(9) The expected amount of load of each area is calculated on the basis of the information of (6) similar to the area environment load calculation module 210. As a result, an effect check (room) table 2600 illustrated in FIG. 26 is created. The effect check (room) table 2600 has the same configuration as the effect check (room) table 2000 illustrated in FIG. 20.

(10) The expected amount of load of each person is calculated on the basis of the information of (9) similar to the environment load calculation module 220. As a result, an effect check (individual) table 2700 illustrated in FIG. 27 is created. The effect check (individual) table 2700 has the same configuration as the effect check (individual) table 2100 illustrated in FIG. 21.

P5: Case of "(A) proposal for movement of a seating position+(C) proposal for adjustment of a lighting apparatus"

(7) The amount of environment load of each area at the time t is acquired from the area information acquisition server 310.

(8) An apparatus ID which is not used is specified from (6) and the area attribute receiving module 150 and the amount of environment load is set to zero. In this case, the minimum amount of environment load required for an operation may be set. In addition, an apparatus whose power consumption increases is specified and a predetermined value is added. In this case, certain distribution board power may be appended to each area where it is used by proportional division. In this example, 30 Wh is left for each of L1001-a, L1001-b, and L1001-c. In addition, electric power of the distribution board is increased by 30 Wh per person by introduction of individual lighting.

(9) The expected amount of load of each area is calculated on the basis of the information of (6) similar to the area environment load calculation module 210. As a result, an effect check (room) table 2800 illustrated in FIG. 28 is created. The effect check (room) table 2800 has the same configuration as the effect check (room) table 2000 illustrated in FIG. 20.

(10) The expected amount of load of each person is calculated on the basis of the information of (9) similar to the environment load calculation module 220. As a result, an effect check (individual) table 2900 illustrated in FIG. 29 is created. The effect check (individual) table 2900 has the same configuration as the effect check (individual) table 2100 illustrated in FIG. 21. In addition, the value in parentheses in the column regarding the amount of environment load 2934 is a value when the total load is assigned to an individual.

P6: Case of "(B) proposal for adjustment of an air conditioning apparatus+(C) proposal for adjustment of a lighting apparatus"

(7) The amount of environment load of each area at the time t is acquired from the area information acquisition server 310.

(8) An apparatus ID which is not used is specified from the area attribute receiving module 150 and the amount of environment load is set to zero. In this case, the minimum amount of environment load required for an operation may be set. In addition, an apparatus whose power consumption increases is specified and a predetermined value is added. In this case, certain distribution board power may be appended to each area where it is used by proportional division. In this example, electric energy of A1001, A1002, L1001-a, L1001-b, and L1001-c is set to zero. In addition, electric power of the distribution board is increased by 530 Wh per person by introduction of individual air conditioning and individual lighting.

(9) The expected amount of load of each area is calculated on the basis of the information of (6) similar to the area environment load calculation module 210. As a result, an effect check (room) table 3000 illustrated in FIG. 30 is created. The effect check (room) table 3000 has the same configuration as the effect check (room) table 2000 illustrated in FIG. 20.

(10) The expected amount of load of each person is calculated on the basis of the information of (9) similar to the environment load calculation module 220. As a result, an effect check (individual) table 3100 illustrated in FIG. 31 is created. The effect check (individual) table 3100 has the same configuration as the effect check (individual) table 2100 illustrated in FIG. 21.

P7: Case of "(A) proposal for movement of a seating position+(B) proposal for adjustment of an air conditioning apparatus+(C) proposal for adjustment of a lighting apparatus"

(7) The amount of environment load of each area at the time t is acquired from the area information acquisition server 310.

(8) An apparatus ID which is not used is specified from (6) and the area attribute receiving module 150 and the amount of environment load is set to zero. In this case, the minimum amount of environment load required for an operation may be set. In addition, an apparatus whose power consumption increases is specified and a predetermined value is added. In this case, certain distribution board power may be appended to each area where it is used by proportional division. In this example, electric energy of A1001, A1002, L1001-a, L1001-b, and L1001-c is set to zero. In addition, electric power of the distribution board is increased by 530 Wh per person by introduction of individual air conditioning and individual lighting.

Figure 32:
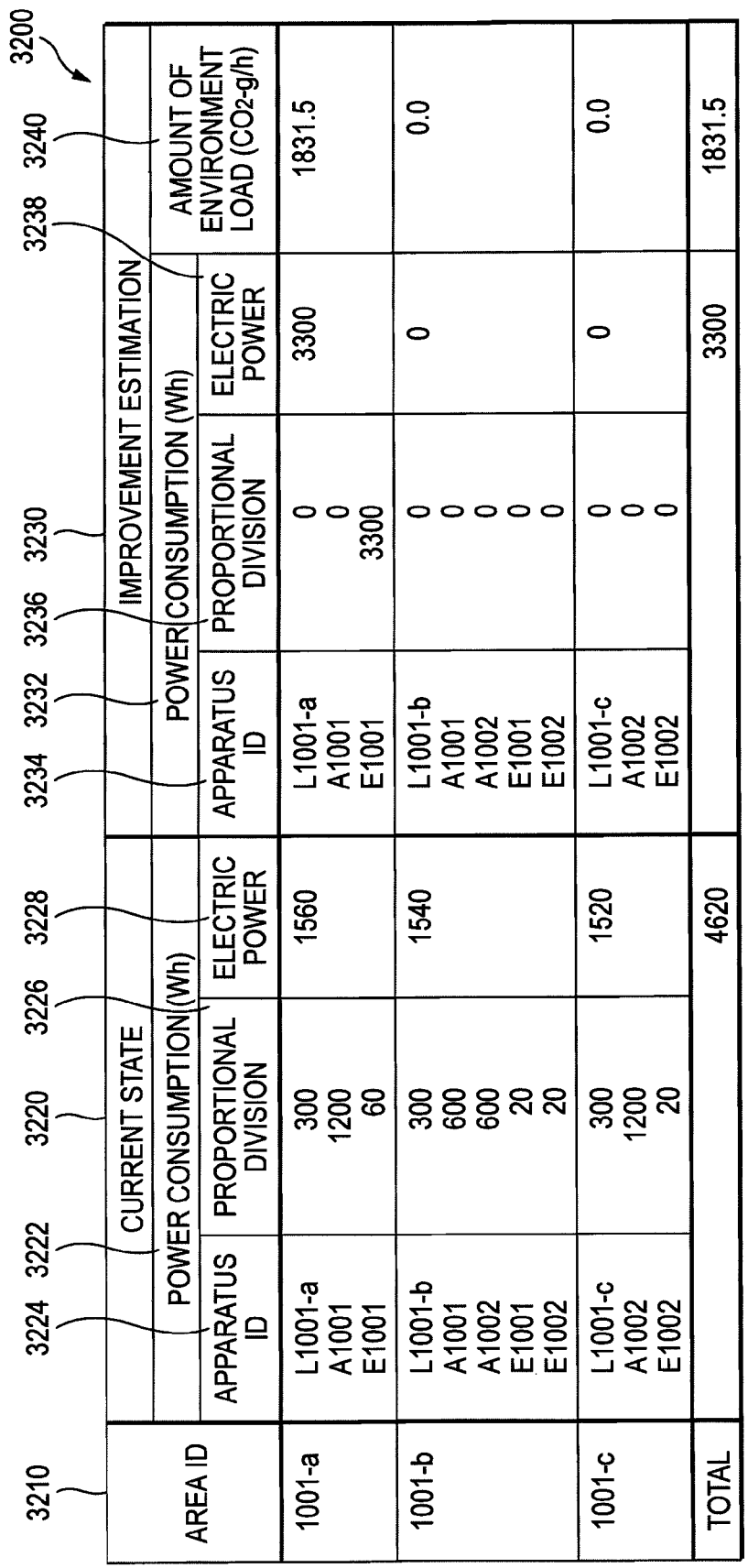
FIG. 32 is an explanatory view showing an example of the data structure of an effect check (room) table.

(9) The expected amount of load of each area is calculated on the basis of the information of (6) similar to the area environment load calculation module 210. As a result, an effect check (room) table 3200 illustrated in FIG. 32 is created. The effect check (room) table 3200 has the same configuration as the effect check (room) table 2000 illustrated in FIG. 20.

(10) The expected amount of load of each person is calculated on the basis of the information of (9) similar to the environment load calculation module 220. As a result, an effect check (individual) table 3300 illustrated in FIG. 33 is created. The effect check (individual) table 3300 has the same configuration as the effect check (individual) table 2100 illustrated in FIG. 21.

Processing (processing of selecting a proposal candidate) in step S1704 performed by the improvement proposal calculation module 230 will be described.

On the basis of the number of users whose environment load is reduced among users, a policy to be proposed is selected. This selected policy is output from the output module 250. As an example of "being based on the number of users whose environment load is reduced", comparing the number of users whose environment load is reduced with the threshold value set in advance and selecting it may be mentioned. More specifically, the number of users whose environment load is reduced may be selected when it is equal to or larger than the threshold value set in advance. Moreover, assuming that the threshold value set in advance is the number of all users at that time, there is an environment load reduction effect for all users. In this example, the case is selected in which the total environment load is minimum and there is an effect for all users.

The improvement proposal calculation module 230 outputs, for example, a proposal candidate selection table 3400 as a result of the selection processing. FIG. 34 is an explanatory view showing an example of the data structure of the proposal candidate selection table 3400. The proposal candidate selection table 3400 has a model column 3410, a total column 3420, a column regarding an effect of an individual 3430, and a proposal candidate column 3440. In the model column 3410, an improvement proposal ID which is a reference numeral for identifying the content of an improvement proposal or an improvement proposal uniquely in the present embodiment is stored. In the total column 3420, the information regarding an effect obtained by the improvement proposal is stored. The total column 3420 has an improvement effect column 3422 and a rank column 3424. In the improvement effect column 3422, the amount of $CO_2$ reduced by the improvement proposal is stored. For example, in a row of P1, the sum of the column regarding the amount of environment load 2040 of the effect check (room) table 2000 is subtracted from the amount of $CO_2$ (4620×0.555=2564.1) converted from the sum of the electric power column 2028 of the effect check (room) table 2000. In the rank column 3424, the rank is stored in order of high value in the improvement effect column 3422. In the column regarding an effect of an individual 3430, a result of determination regarding whether or not there has been an effect in the individual of all users is stored. This is determined using the effect check (individual) tables 2100, 2300, 2500, 2700, 2900, 3100, and 3300. In the proposal candidate column 3440, a result regarding whether or not selection as a proposal candidate has been made ("O" when selection has been made) is stored. In addition, this selection is effective in the individual of all users. Among them, the most effective one as a whole is selected.

In addition, although six persons are in a room in the example of the proposal candidate selection table 3400 shown in FIG. 34, P1 becomes a proposal candidate when the number of persons is increased later from two persons to become eight persons.

Next, details of processing of the improvement proposal updating module 240 will be described.

The content of a proposal may change every moment such as in the case where people frequently come in and out of a room. This processing is to meet such a case.

For example, the following determination processing is performed by improvement proposal updating module 240.

(A1) It is determined whether or not the improvement effect of the amount of environment load exceeds a threshold value set in advance. If the determination result is No, updating is not performed.

(A2) If the determination processing of (A1) is Yes, the content of an improvement proposal is updated. For example, assuming that the threshold value is 500 $CO_2$-g/h, the improvement proposal P5 exceeds the threshold value. Accordingly, the proposal is updated.

In addition, the following determination processing is also possible.

(B1) It is determined whether or not the amount of environment load exceeds a threshold value set in advance. If a determination result is No, updating is not performed.

(B2) It is determined whether or not a state where the determination processing of (B1) is YES continues for a period set in advance or more. If the determination result is No, updating is not performed.

(B3) If the determination processing of (B2) is Yes, the content of an improvement proposal is updated.

Moreover, in order to update the content of a proposal, the improvement proposal updating module 240 controls the processing of the area environment load calculation module 210, the environment load calculation module 220, the improvement proposal calculation module 230, and the output module 250 to be performed again at that point in time.

As a reference of processing for determination regarding whether or not it has become a "situation set in advance", the following cases are also possible in addition to the threshold value described above. That is, "when the number of users in the area is increased or decreased (specifically, when a user moves to another area, when a user moves to a conference room, or when a user goes home)" and "when it becomes a time set in advance (specifically, at fixed intervals, when it becomes a time set in advance according to the working pattern, or according to facilities use schedule)" are also possible, for example. In addition, determination based on the combination (and/or) of those described above may also be performed.

For example, assuming that a person who is seated follows the improvement proposal P5 and then two persons newly enter the room and start to work similarly under the improvement proposal P5 (individual lighting in the same area), the calculation result of the improvement proposal calculation module 230 becomes a proposal candidate selection table 3500. FIG. 35 is an explanatory view showing an example of the data structure of the proposal candidate selection table 3500. The proposal candidate selection table 3500 has a model column 3510, a total column 3520, a column regarding an effect of an individual level 3530, and a proposal candidate column 3540, and its configuration is the same as that of the proposal candidate selection table 3400. Since it is clear that the environment load is increased if an individual air conditioning apparatus is used, the improvement proposals P2, P4, P6, and P7 are omitted for the sake of simplicity. In addition, the improvement proposals P3 and P5 are maintained as they are. In this case, although P1 becomes an improvement proposal candidate, updating is not performed when the proposal is updated only by the threshold value but an improvement proposal is updated to P1 when an increase in the number of users is a reference.

Next, details of processing of the user environment load presenting module 140 will be described.

The user environment load presenting module 140 prints, displays, alarms, or records the amount of environment load of each individual using a designated method. As a presentation method, a means which causes a new environment load for presentation is avoided in consideration of an environment load, and existing presentation apparatuses are used. For example, a method of presentation to the entry and exit gate panel 346 of a gate which performs ID check for entry and exit, a method of presentation to a liquid crystal panel for operation of a multifunction printer (multifunction printer panel 344), a method of transmission to a user address using an e-mail, and a method of display on an individual portal (for example, schedule management software of the terminal device 342 such as a mobile) may be mentioned.

The following (1) alone, (1)+(2), or (1)+(2)+(3) and the content of display may be changed according to the type of presentation apparatus, screen size, and the like.

Figure 36:
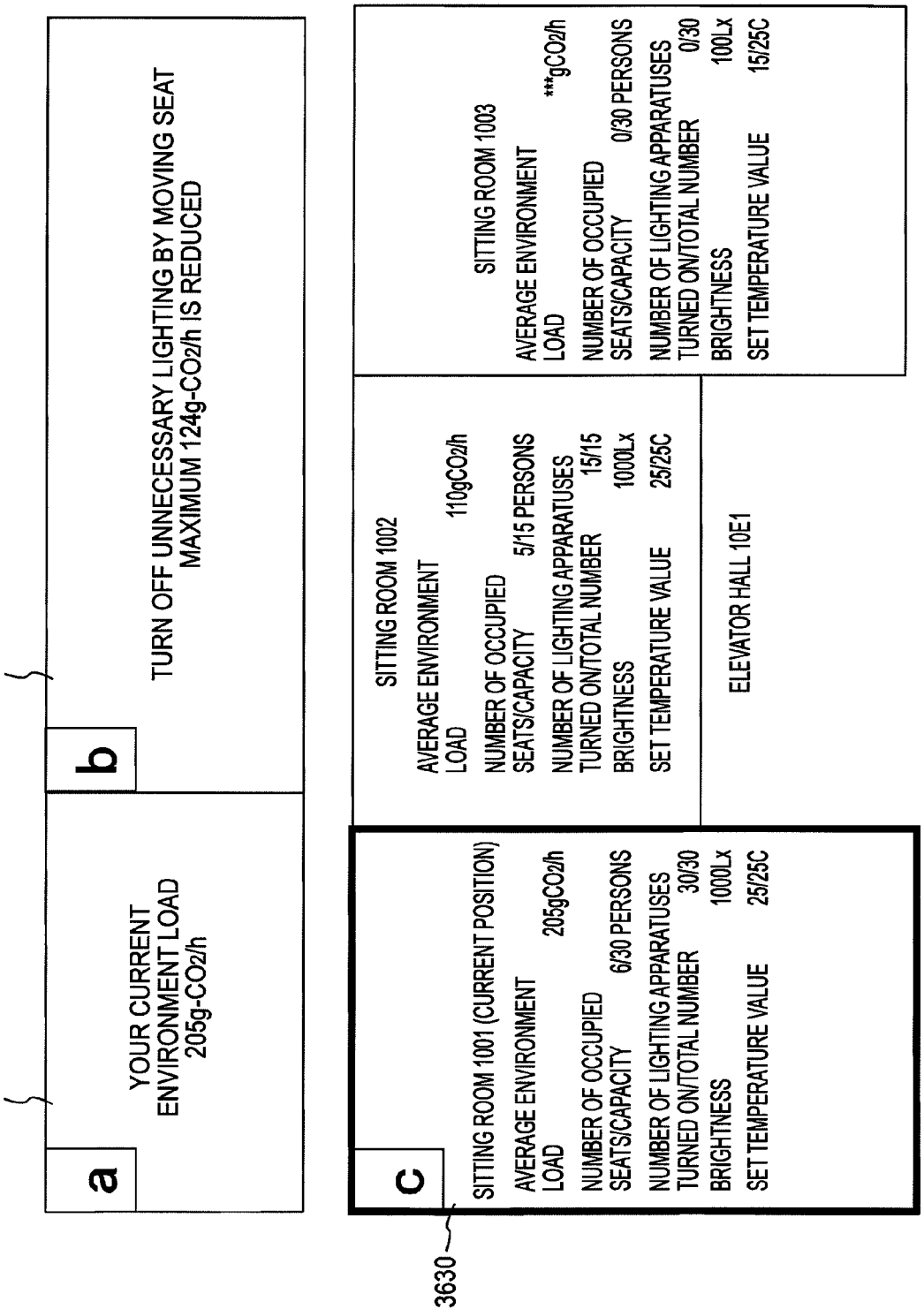
FIG. 36 is an explanatory view showing an example of a screen displayed in the first embodiment.
Figure 37:
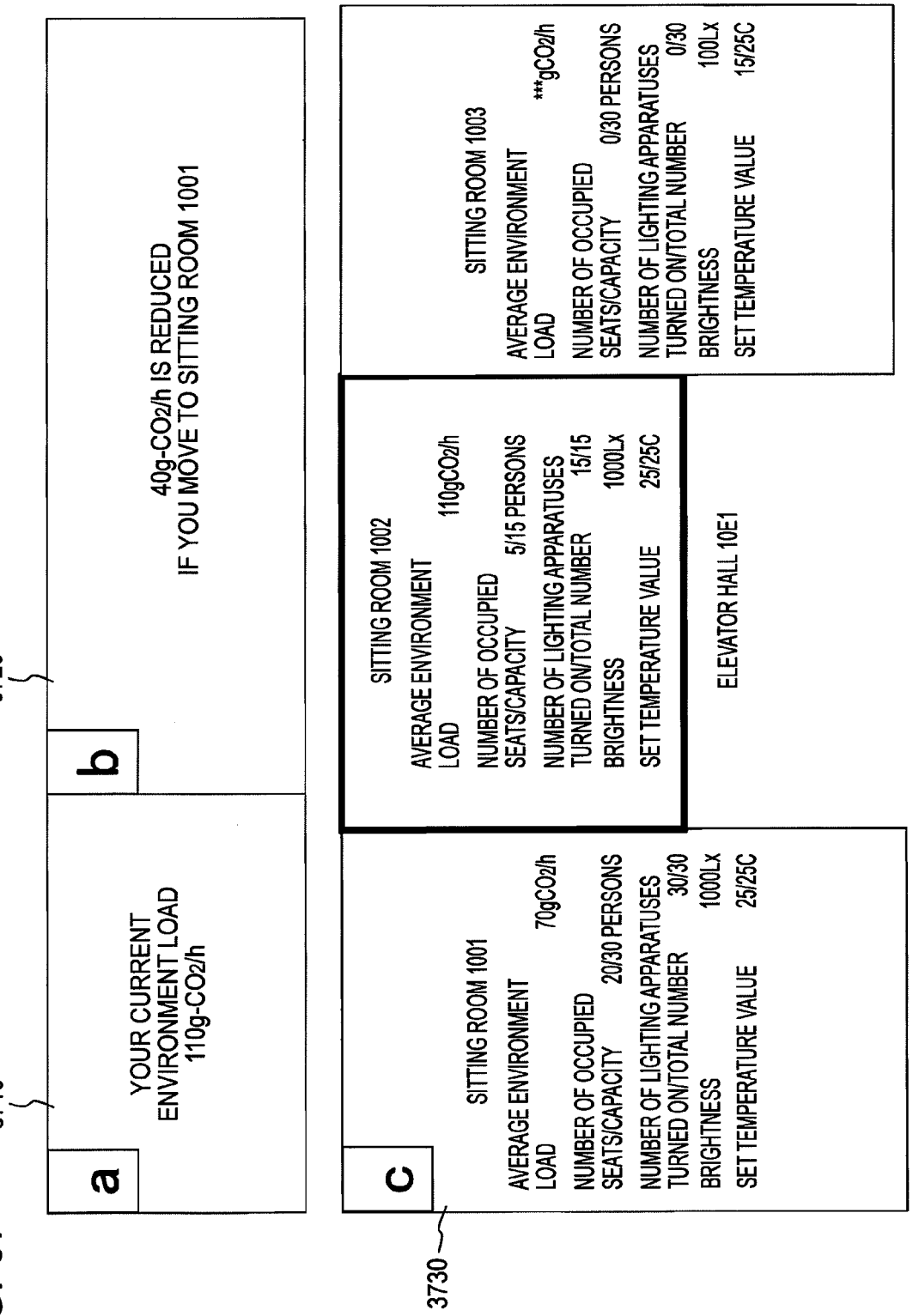
FIG. 37 is an explanatory view showing an example of a screen displayed in the first embodiment.
Figure 38:
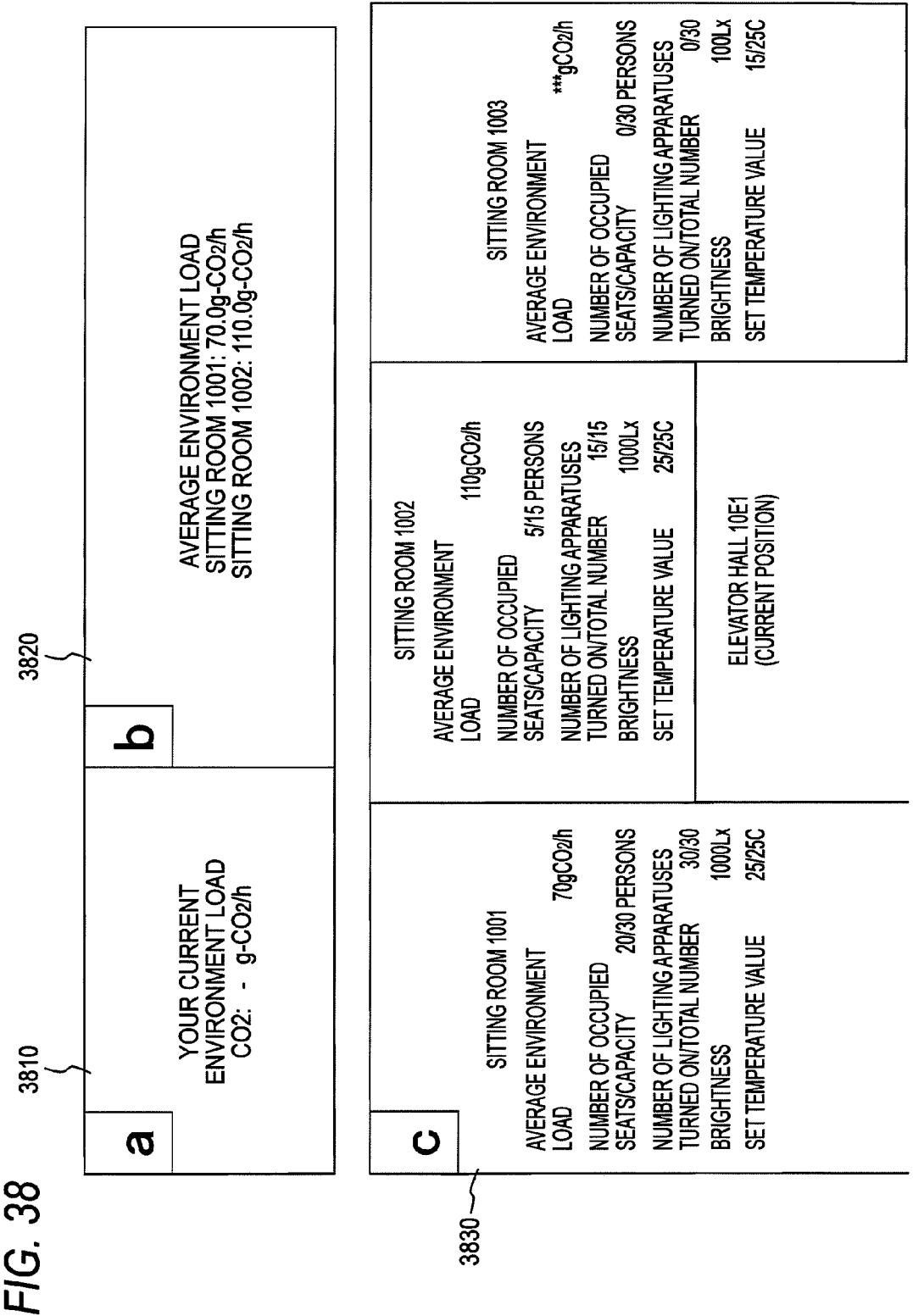
FIG. 38 is an explanatory view showing an example of a screen displayed in the first embodiment.

(1) Environment load situation of the user
(2) Content of an improvement proposal
(3) Environment load situation of an area For example, for a user A, there is a display form illustrated in FIG. 36. A display screen is divided into a display region 3610 where (1) is displayed, a display region 3620 where (2) is displayed, and a display region 3630 where (3) is displayed. In particular, a workroom 1001 where the user A is staying may be displayed differently from other rooms (workroom 1001 is surrounded with a thick line and the information regarding the "(current position)" is displayed). In addition, for a user B, there is a display form illustrated in FIG. 37. The display form is the same as that shown in FIG. 36, and a workroom 1002 where the user B is staying may be displayed differently from other rooms. In addition, for a user C, there is a display form illustrated in FIG. 38. The display form is the same as that shown in FIG. 36, and an elevator hall where the user C is staying may be displayed differently from other rooms.

Moreover, as presentation methods other than the display of the user environment load presenting module 140, in-building broadcast (voice) is possible or lighting/air conditioning of a shared area may be (gradually) turned OFF by remote control. In addition, the combination (and/or) of these is also possible.

Figure 39:
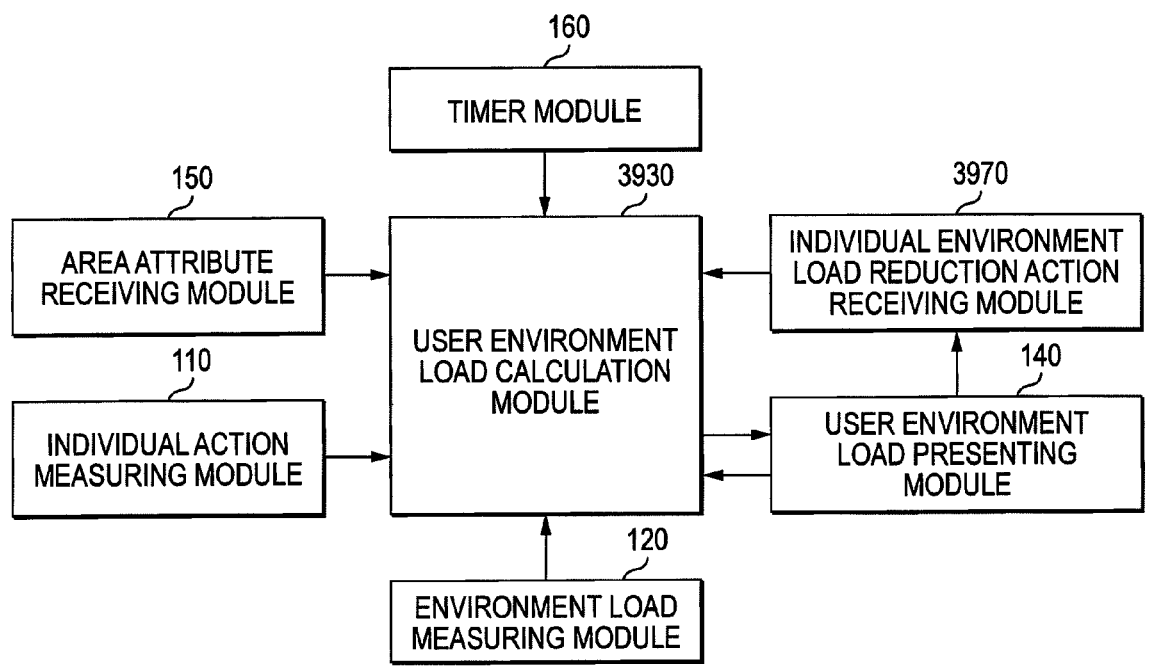
FIG. 39 is a view showing the conceptual module configuration in a configuration example of a second embodiment.

FIG. 39 is a view showing the conceptual module configuration in a configuration example of a second embodiment. An individual action measuring module 110, an environment load measuring module 120, a user environment load calculation module 3930, a user environment load presenting module 140, an area attribute receiving module 150, a timer module 160, and an individual environment load reduction action receiving module 3970. Moreover, the same components as in the first embodiment are denoted by the same reference numerals, and a repeated explanation thereof will be omitted.

The individual action measuring module 110 is connected to the user environment load calculation module 3930. The environment load measuring module 120 is connected to the user environment load calculation module 3930. The user environment load calculation module 3930 is connected to the individual action measuring module 110, the environment load measuring module 120, the user environment load presenting module 140, the area attribute receiving module 150, the timer module 160, and the individual environment load reduction action receiving module 3970. The user environment load presenting module 140 is connected to the user environment load calculation module 3930 and the individual environment load reduction action receiving module 3970. The area attribute receiving module 150 is connected to the user environment load calculation module 3930. The timer module 160 is connected to the user environment load calculation module 3930. The individual environment load reduction action receiving module 3970 is connected to the user environment load calculation module 3930 and the user environment load presenting module 140.

The individual environment load reduction action receiving module 3970 receives an environment load reduction action, which a user actually executes (or executed), among environment load reduction actions presented by the user environment load presenting module 140. When the user takes environment load reduction action intentionally according to an improvement proposal presented by the user environment load presenting module 140, the user selects an environment load reduction action before acting (or after acting).

The individual environment load reduction action receiving module 3970 receives the selection operation. Since it is a selection from environment load reduction actions which are improvement proposals presented by the user environment load presenting module 140, the individual environment load reduction action receiving module 3970 performs reception corresponding to the user environment load presenting module 140. For example, it may be selected on a liquid crystal display of a gate, which performs ID check for entry and exit, or on a liquid crystal panel for operation of a multifunction printer, or the environment load reduction action to be executed may be selected through an e-mail or a personal portal screen. For example, when the user environment load presenting module 140 performs display such as in an example shown in FIG. 40 and the user selects an execution button in FIG. 40, the individual environment load reduction action receiving module 3970 receives the selection action.

The user environment load calculation module 3930 has the same configuration as the environment load calculation module 130 in the first embodiment and performs the same processing accordingly. When the individual environment load reduction action receiving module 3970 receives a selection operation, the user environment load calculation module 3930 determines whether or not the operation selected by the individual environment load reduction action receiving module 3970 has been executed on the basis of the information from the individual action measuring module 110, the environment load measuring module 120, and the area attribute receiving module 150. If the operation has been executed, the user environment load calculation module 3930 calculates how much the environment load is reduced by the operation. The calculation result may be stored in an internal database together with the information regarding the user who acted. Referring to the configuration illustrated in FIG. 2, after a policy to be proposed is output from the user environment load presenting module 140, the processing of the area environment load calculation module 210 and the environment load calculation module 220 is performed and processing results of the environment load calculation module 220 before and after the output from the user environment load presenting module 140 are compared. Specifically, calculating the reduced amount of environment load (calculating a difference between the environment load before output and the environment load after output) is included as the comparison. In addition, the ranking of the reduced amount of environment load within the users may be created after calculating the reduced amount of environment load. Then, the user environment load presenting module 140 outputs the comparison result.

By presenting the reduced amount of environment load based on the environment load reduction action of the user, which is calculated by the user environment load calculation module 3930, using the user environment load presenting module 140, it can be seen quantitatively how much the environment load is reduced by user's behavior change. Moreover, in order to improve motivation to perform environment load reduction actions, an incentive may be given to a user according to the amount of reduction of the user.

FIG. 40 is an explanatory view showing an example of a screen displayed by the user environment load presenting module 140 in the second embodiment. Compared with the screen example illustrated in FIG. 37, an execution button indicating that a user executes (or executed) the improvement proposal is displayed in a display region 4020. The individual environment load reduction action receiving module 3970 detects that this execution button has been selected and makes the user environment load calculation module 3930 calculate an environment load of each user at that point in time. Then, a display region 4040 is newly displayed after the calculation ends. The amount of $CO_2$ reduced as a reduced amount of environment load, which has been calculated by the user environment load calculation module 3930, is displayed in the display region 4040, and the ranking of the reduced amount of environment load within users is also displayed in the display region 4040. In addition, display regions 4010 and 4030 are the same as the display regions 3710 and 3730 illustrated in FIG. 37, respectively.

An illuminance measuring module which measures the illuminance of an area in a room may be added to the environment load measuring module 120 of the first or second embodiment, so that a lighting apparatus adjusts the brightness (stopping an operation of a lighting apparatus is also included) according to the illuminance measured by the illuminance measuring module and the environment load measuring module 120 calculates the environment load of the lighting apparatus after brightness adjustment in the area. This is to take the influence of sunlight into consideration. For example, in an area on the window side of a room in the daytime, the illuminance is high. Accordingly, the brightness of the lighting apparatus in the area is decreased to reduce the environment load.

Figure 41:
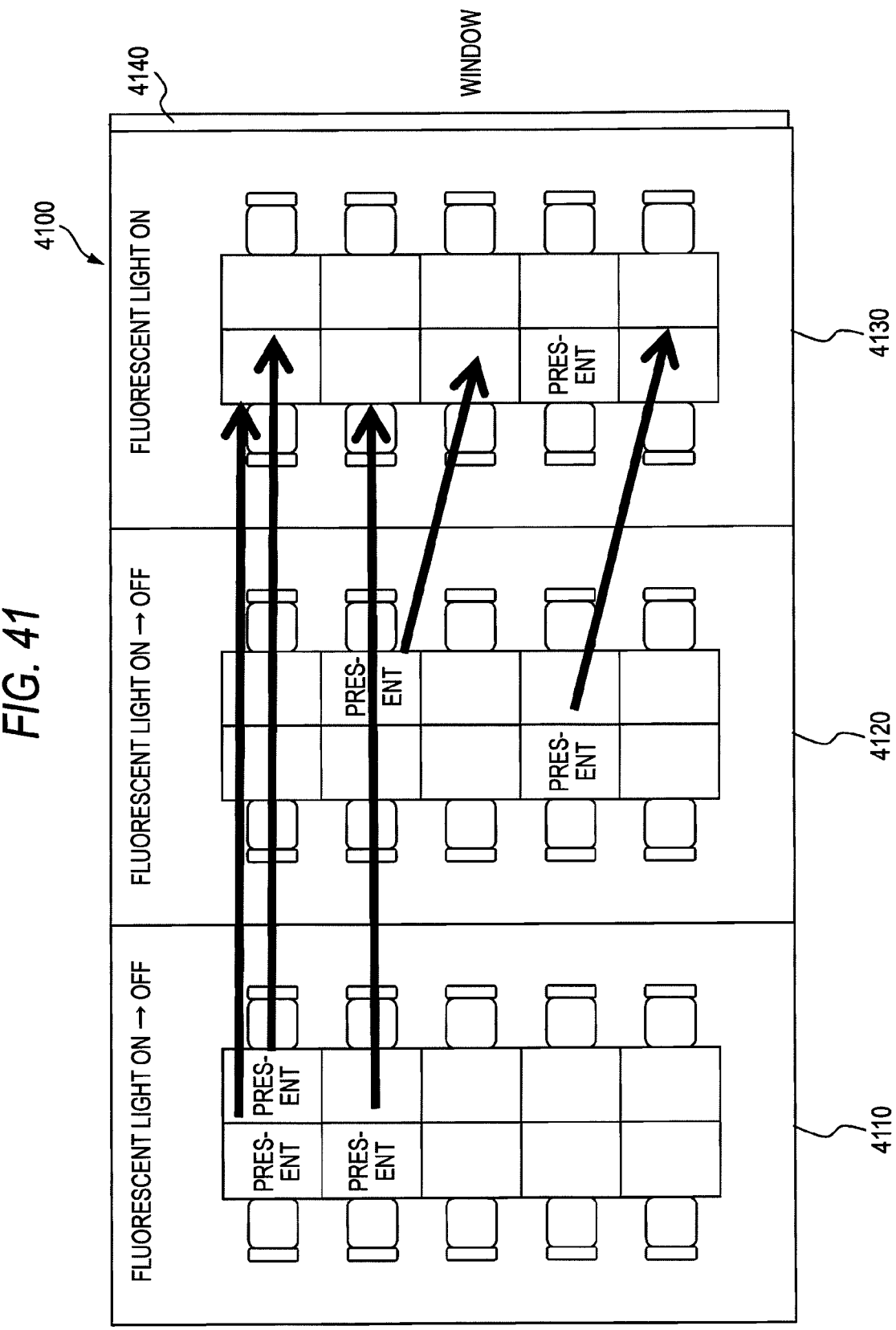
FIG. 41 is an explanatory view showing a processing example (1) in a modification.

For example, FIG. 41 is an explanatory view showing a processing example (1) in a modification. A room 4100 is divided into areas 4110, 4120, and 4130, and the area 4130 is located at the window 4140 side. Six persons work in a workroom of the room 4100 in the daytime.

Since the relationships of "power consumption of a lighting apparatus in the area 4110>power consumption of a lighting apparatus in the area 4130" and "power consumption of a lighting apparatus in the area 4120>power consumption of a lighting apparatus in the area 4130" are satisfied, an environment load reduction proposal to move users seated in the area 4110 and 4120 to the area 4130 may be included in the improvement proposal calculation module 230. Although both the areas 4110 and 4130 were possible in the first embodiment, only the area 4130 is selected in this case.

A temperature measuring module which measures the temperature of an area in a room and the outside temperature may be added to the environment load measuring module 120 of the first or second embodiment, so that the environment load measuring module 120 calculates the environment load of an air conditioning apparatus on the basis of a difference between the temperature of the area in the room and the outside temperature measured by the temperature measuring module. Here, "being based on the temperature difference" is to compare the difference with a threshold value set in advance and calculate the environment load of an air conditioning apparatus if the difference is equal to or larger than the threshold value, for example. This is to meet a case where there is a difference in power consumption of an air conditioning apparatus in each area since a temperature difference between areas in a room is also large if a difference between the outside temperature and the room temperature is large (when there is a difference equal to or larger than the value set in advance).

For example, FIG. 42 is an explanatory view showing a processing example (2) in the modification. A room 4200 is divided into areas 4210, 4220, and 4230. The area 4230 is located at the window 4240 side. Six persons work in this workroom at night. In summer or winter, a difference between the outside temperature and the room temperature is large, and the heat conductivity of a window is higher than that of a wall surface. Accordingly, since the relationships of "power consumption of an air conditioning apparatus in the area 4210<power consumption of an air conditioning apparatus in the area 4230" and "power consumption of an air conditioning apparatus in the area 4210<power consumption of an air conditioning apparatus in the area 4220" are satisfied, an environment load reduction proposal to move users seated in the area 4220 and 4230 to the area 4210 may be included in the improvement proposal calculation module 230. Although both the areas 4210 and 4230 were possible in the first embodiment, only the area 4210 is selected in this case.

The two modifications described above may be combined. That is, the illuminance measuring module which measures the illuminance of an area in a room and the temperature measuring module which measures the temperature of a room and the outside temperature may be added to the environment load measuring module 120 of the first or second embodiment. In addition, a lighting apparatus may be made to adjust its brightness (stopping an operation of a lighting apparatus is also included) according to the illuminance measured by the illuminance measuring module. The environment load measuring module 120 may calculate the environment load of a lighting apparatus after brightness adjustment in the area and calculate the environment load of an air conditioning apparatus on the basis of a difference between the temperature of the area in the room and the outside temperature measured by the temperature measuring module. This is to meet a case where the difference between the outside temperature and the room temperature is large (case where there is a difference equal to or larger than the value set in advance) when there is an influence due to sunlight.

For example, referring to FIG. 42, the relationships of "power consumption of a lighting apparatus in the area 4210>power consumption of a lighting apparatus in the area 4230" and "power consumption of a lighting apparatus in the area 4220>power consumption of a lighting apparatus in the area 4230" are satisfied when there is an influence of sunlight. On the other hand, when the difference between the outside temperature and the room temperature is large, the relationships of "power consumption of an air conditioning apparatus in the area 4210<power consumption of an air conditioning apparatus in the area 4230" and "power consumption of an air conditioning apparatus in the area 4210<power consumption of an air conditioning apparatus in the area 4220" are satisfied because the heat conductivity of a window is higher than that of a wall surface. An environment load reduction proposal that a user should move the seat to the area with less power consumption may be included in the improvement proposal calculation module 230.

Also in this case, performing the same calculation as in the first or second embodiment leads to a proposal for movement to the area with less power consumption.

Moreover, as illustrated in FIG. 43, the hardware configuration of a computer executed by a program as the present embodiment is the same as that of a typical computer. Specifically, the computer executed by the program as the present embodiment is a personal computer, a computer that can serve as a server, and the like. That is, as a specific example, a CPU 4301 is used as a processing unit (operation unit) and a RAM 4302, a ROM 4303, and an HD 4304 are used as storage devices. As the HD 4304, for example, a hard disk may be used. The hardware configuration of a computer executed by a program as the present embodiment includes: a CPU 4301 for executing programs of modules, such as the individual action measuring module 110, the environment load measuring module 120, the environment load calculation module 130, the user environment load presenting module 140, the area attribute receiving module 150, the timer module 160, the area environment load calculation module 210, the environment load calculation module 220, the improvement proposal calculation module 230, the improvement proposal updating module 240, the output module 250, and the load improvement processing module 260; the RAM 4302 in which the programs or the data is stored; the ROM 4303 in which a program used to start the computer and the like are stored; the HD 4304 which is an auxiliary storage device; a reception device 4306 which receives the data on the basis of a user's operation on a keyboard, a mouse, a touch panel, and the like; an output device 4305, such as a CRT or a liquid crystal display; a communication line interface 4307 used for connection with a communication network, such as a network interface card; and a bus 4308 which connects these components so that the data can be exchanged therebetween. The plurality of computers may be connected to each other through a network.

In the case of the above embodiment based on a computer program, the embodiment is realized by reading the computer program, which is software, into a system with the above-described hardware configuration and making the software and hardware resources cooperate with each other.

In addition, the hardware configuration shown in FIG. 43 is just an example of the configuration. The present embodiment is not limited to the configuration shown in FIG. 43 but may be a configuration in which the modules described in the present embodiment can be executed. For example, some of the modules may be realized using dedicated hardware (for example, ASIC). Some of the modules may be provided in an external system so as to be connectable to each other through a communication line. In addition, a plurality of systems shown in FIG. 43 may be connected to each other through a communication line so as to operate cooperatively. In particular, in addition to the personal computer, the modules may be included in information appliances, a copying machine, a facsimile, a scanner, a printer, a complex machine (image processing apparatus having two or more functions of a scanner, a printer, a copying machine, and a facsimile), and the like.

In addition, the program described above may be provided in a state where the program is stored in a recording medium or the program may be provided through a communication unit. In this case, the program may be regarded as the invention of a "computer-readable recording medium in which a program is recorded", for example.

The "computer-readable recording medium in which a program is recorded" refers to a recording medium that can be read by a computer recorded with a program, which is used for installation, execution, distribution, and the like of the program.

In addition, examples of recording media include: in association with a digital versatile disk (DVD), 'DVD-R, DVD-RW, DVD-RAM, and the like' that are standards established by a DVD forum and 'DVD+R, DVD+RW, and the like' that are standards established by a DVD+RW forum; in association with a compact disk (CD), a read only memory (CD-ROM), a CD recordable (CD-R), and a CD rewritable (CD-RW), and the like; a Blu-ray disk (registered trademark); a magneto-optical disk (MO); a flexible disk (FD); a magnetic tape; a hard disk; a read only memory (ROM); an electrically erasable and programmable read only memory (EEPROM); a flash memory; and a random access memory (RAM).

In addition, the program or a part of the program may be stored or distributed in a state where the program or the part of the program is recorded in the recording media. In addition, the program may be transmitted by communication, for example, through a wireline network such as a local area network (LAN), a metropolitan area network (MAN), a wide area network (WAN), Internet, an intranet, and an extranet or through a wireless communication network. Alternatively, the program may be transmitted through a transmission medium obtained by combination of those described above or may be carried on a carrier.

In addition, the program may be a part of another program or may be recorded on a recording medium together with a separate program. In addition, the program may be separated and recorded in a plurality of recording media. In addition, the program may be recorded in any kind of format including compression, encryption, and the like as long as the program can be restored.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to control operations of:
an area environment load calculation module configured to calculate an amount of electricity consumed by devices in an area in a room;
a user environment load calculation module configured to calculate an amount of electricity consumed by a user in the area based on the amount of electricity consumed by the devices in the area in the room calculated by the area environment load calculation module;
a user improvement environment load calculation module configured to calculate a reduced amount of electricity consumed by the user based on a policy;
a comparison module configured to determine a difference between the amount of electricity consumed by the user calculated by the user environment load calculation module with the reduced amount of electricity consumed by the user calculated by the user improvement environment load calculation module, and configured to determine whether the difference is greater than an improvement effect threshold; and
an output module that outputs the policy as a proposal to reduce an environment load in response to the comparison of the comparison module determining that the difference is greater than the improvement effect threshold.

2. The information processing apparatus according to claim 1, wherein the proposal comprises at least one of moving a seat of the user, controlling an operation of an air conditioning apparatus in the area, or controlling an operation of a lighting apparatus in an area.

3. The information processing apparatus according to claim 1, wherein the proposal comprises controlling an operation of an air conditioning apparatus in the area in the room.

4. The information processing apparatus according to claim 1, wherein the proposal comprises controlling an operation of a lighting apparatus in the area in the room.

5. The information processing apparatus according to claim 1, wherein the area environment load measuring module comprises:
an illuminance measuring module configured to measure illuminance of the area in the room, and
wherein the area environment load calculation module is configured to calculate the amount of electricity consumed by a lighting apparatus in the area in the room based on the illuminance.

6. The information processing apparatus according to claim 1, wherein the area environment load measuring module comprises:
a temperature measuring module configured to measure a temperature of the area in the room and the outside temperature, and
wherein the area environment load calculation module is configured to calculate the amount of electricity consumed by an air conditioning apparatus based on a difference between the temperature of the area in the room and the outside temperature.

7. A non-transitory computer readable medium storing a program causing a computer to execute a process for information processing, the process comprising:
calculating an amount of electricity consumed by devices in an area in a room;
calculating an amount of electricity consumed by a user in the area based on the amount of electricity consumed by the devices in the area in the room;
calculating a reduced amount of electricity consumed by the user, based on a policy;
determining a difference between the amount of electricity consumed by the user and the reduced amount of electricity consumed by the user;
determining that the difference is greater than an improvement effect threshold; and
outputting the policy as a proposal to reduce an environment load in response to determining the difference is greater than the improvement effect threshold.

8. An information processing apparatus comprising:
a processor configured to control operations of:
- an area environment load calculation module configured to calculate an amount of electricity consumed by devices in an area in a room;
- a user environment load calculation module configured to calculate an amount of electricity consumed by a user in the area based on the amount of electricity consumed by the devices in the area in the room calculated by the area environment load calculation module;
- a user improvement environment load calculation module configured to calculate a reduced amount of electricity consumed by the user based on a policy;
- a comparison module configured to determine a difference between the amount of electricity consumed by the user calculated by the user environment load calculation module with the reduced amount of electricity consumed by the user calculated by the user improvement environment load calculation module, and configured to determine whether the difference is greater than an improvement effect threshold;
- an output module that outputs the policy as a proposal to reduce an environment load in response to the comparison module determining that the difference is greater than the improvement effect threshold; and
- an improvement calculation module that verifies effective use of space when the proposal is performed by obtaining a number of users in the area, a capacity of the room, and a capacity of the area in the room, and determining that consolidation of locations of the users in the room is possible based on the number of users in the area, the capacity of the room, and the capacity of the area.

* * * * *